(12) United States Patent
Kim et al.

(10) Patent No.: US 12,085,730 B2
(45) Date of Patent: Sep. 10, 2024

(54) CAMERA MODULE

(71) Applicant: LG INNOTEK CO., LTD., Seoul (KR)

(72) Inventors: Kyung Won Kim, Seoul (KR); Chang Yeon Kim, Seoul (KR); Hyun Gyu Roh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 374 days.

(21) Appl. No.: 17/613,358

(22) PCT Filed: May 27, 2020

(86) PCT No.: PCT/KR2020/006870
§ 371 (c)(1),
(2) Date: Nov. 22, 2021

(87) PCT Pub. No.: WO2020/242202
PCT Pub. Date: Dec. 3, 2020

(65) Prior Publication Data
US 2022/0221734 A1 Jul. 14, 2022

(30) Foreign Application Priority Data

May 28, 2019 (KR) .................. 10-2019-0062718
Jun. 4, 2019 (KR) .................. 10-2019-0066052

(51) Int. Cl.
*G03B 5/00* (2021.01)
*G02B 27/64* (2006.01)
(Continued)

(52) U.S. Cl.
CPC ............ *G02B 27/646* (2013.01); *G03B 5/00* (2013.01); *G03B 30/00* (2021.01);
(Continued)

(58) Field of Classification Search
None
See application file for complete search history.

(56) References Cited

U.S. PATENT DOCUMENTS

2012/0140345 A1 6/2012 Chiu
2014/0355120 A1* 12/2014 Yeo .................. G02B 13/001
359/557
(Continued)

FOREIGN PATENT DOCUMENTS

CN 104849943 A 8/2015
JP 2011-112918 A 6/2011
(Continued)

*Primary Examiner* — Derek S. Chapel
(74) *Attorney, Agent, or Firm* — Birch, Stewart, Kolasch & Birch, LLP

(57) ABSTRACT

A camera module is provided. A camera module according to an aspect of the present invention comprises: a stator; a mover arranged in the stator; a first driver arranged on the stator; a second driver arranged on the mover and facing the first driver; a stiffener including an external portion coupled to the stator, an internal portion coupled to the mover, and a connector for connecting the external portion to the internal portion; a substrate coupled to the stator and the mover, and arranged on the stiffener; and a lens module coupled to the substrate.

18 Claims, 22 Drawing Sheets

(51) Int. Cl.
  *G03B 30/00* (2021.01)
  *H02K 41/035* (2006.01)
  *H04N 23/68* (2023.01)

(52) U.S. Cl.
  CPC ....... *H02K 41/0354* (2013.01); *H04N 23/687* (2023.01); *G03B 2205/0007* (2013.01); *G03B 2205/0015* (2013.01); *G03B 2205/0069* (2013.01)

(56) References Cited

U.S. PATENT DOCUMENTS

| | | | |
|---|---|---|---|
| 2015/0010296 A1* | 1/2015 | Yasuda | G02B 27/646 |
| | | | 396/55 |
| 2016/0170227 A1 | 6/2016 | Minamisawa | |
| 2016/0209671 A1 | 7/2016 | Hee et al. | |
| 2017/0082829 A1 | 3/2017 | Kudo et al. | |
| 2019/0025540 A1 | 1/2019 | Shin et al. | |
| 2019/0384034 A1 | 12/2019 | Min et al. | |
| 2020/0033699 A1* | 1/2020 | Kim | G03B 5/04 |

FOREIGN PATENT DOCUMENTS

| | | |
|---|---|---|
| JP | 2015-232682 A | 12/2015 |
| JP | 2018-169495 A | 11/2018 |
| JP | 2018-180506 A | 11/2018 |
| KR | 10-2013-0045505 A | 5/2013 |
| KR | 10-2016-0013838 A | 2/2016 |
| KR | 10-2016-0089557 A | 7/2016 |
| KR | 10-2018-0098078 A | 9/2018 |
| KR | 10-2018-0098765 A | 9/2018 |
| KR | 10-2019-0023437 A | 3/2019 |

* cited by examiner

CAMERA MODULE

CROSS REFERENCE TO RELATED APPLICATIONS

This application is the National Phase of PCT International Application No. PCT/KR2020/006870, filed on May 27, 2020, which claims priority under 35 U.S.C. 119(a) to Patent Application Nos. 10-2019-0062718, filed in the Republic of Korea on May 28, 2019, and 10-2019-0066052, filed in the Republic of Korea on Jun. 4, 2019, all of which are hereby expressly incorporated by reference into the present application.

TECHNICAL FIELD

The present embodiment relates to a camera module.

BACKGROUND ART

The content described hereinafter provides background information on the present embodiment and does not describe the prior art.

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture.

Meanwhile, in recent camera modules, handshake correction function to prevent image shaking phenomenon caused by handshake of a photographer, and autofocus function to align the focal length of the lens by automatically adjusting the distance between the image sensor and the lens are being applied.

DETAILED DESCRIPTION OF THE INVENTION

Technical Subject

A subject to be solved by the present invention is to provide a camera module capable of reducing the size of a product.

In addition, another subject to be solved by the present invention is to provide a driving device for a camera module capable of providing an excellent OIS function without distortion of an image even when photographing a video, and a camera module including the same.

Technical Solution

A camera module according to an aspect of the present invention for achieving the above object includes: a stator; a mover disposed inside the stator; a first driving unit disposed on the stator; a second driving unit disposed on the mover and facing the first driving unit; a stiffener including an outer side portion coupled to the stator, an inner side portion coupled to the mover, and a connecting portion connecting the outer side portion and the inner side portion; a substrate coupled to the stator and the mover and disposed on the stiffener; and a lens module coupled to the substrate.

In addition, the substrate may include an outer side elastic portion coupled to the stator, an inner side elastic portion coupled to the mover, and a connecting elastic portion connecting the outer side elastic portion and the inner side elastic portion.

In addition, the outer side elastic portion and the outer side portion are overlapped in an optical axis direction, the inner side elastic portion and the inner side portion are overlapped in the optical axis direction, and the connecting elastic portion and the connecting portion may be overlapped in the optical axis direction.

In addition, the inner side elastic portion includes first to fourth corner regions, and the outer side elastic portion includes fifth to eighth corner regions adjacent to the first to fourth corner regions, respectively, and the connecting elastic portion may include a first connecting elastic portion connecting the first corner region and the sixth corner region, a second connecting elastic portion connecting the second corner region and the seventh corner region, a third connecting elastic portion connecting the third corner region and the eighth corner region, and a fourth connecting elastic portion connecting the fourth corner region and the fifth corner region.

In addition, the mover may include a groove formed on an upper surface and a first protruding portion protruding higher than the upper surface from the groove, and the first protruding portion may be coupled to the inner side portion and the inner side elastic portion.

In addition, the stator may include a second protruding portion protruding upward from an upper surface, and the second protruding portion may be coupled to the outer side portion and the outer side elastic portion.

In addition, an upper end of the second protruding portion may be disposed higher than an upper end of the first protruding portion.

In addition, the lens module may include a protrusion protruding from a lower surface, and the protrusion may be coupled to the inner side portion and the inner side elastic portion.

In addition, the substrate may include a flexible printed circuit board (FPCB).

In addition, it may include a guide ball disposed between the stator and the mover.

In addition, the mover may include a seating groove formed on an outer side surface, and at least a portion of the guide ball may be disposed in the seating groove.

In addition, a region in contact with the guide ball among inner side surfaces of the stator may be formed as a curved surface.

In addition, the first driving unit may be disposed on a bottom surface of an inner side surface of the stator, and the second driving unit may be disposed on a lower surface of the mover.

In addition, the second driving unit includes: first to fourth magnets having the 2×2 arrangement; in the first and third magnets, regions adjacent to each other have a first polarity, and regions spaced apart from each other have a second polarity; and in the second and fourth magnets, regions adjacent to each other have the first polarity, and regions spaced apart from each other may have the second polarity.

In addition, the first driving unit may include: first and second coils being overlapped with the region having the first polarity among the first to fourth magnets in an optical axis direction; and third and fourth coils being overlapped with the region having the second polarity among the first to fourth magnets in the optical axis direction.

In addition, a length in a first direction of the first and second coils is longer than a length in the first direction of the third and fourth coils, and lengths of the first and second coils in a second direction perpendicular to the first direction may be shorter than lengths of the third and fourth coils in the second direction.

In addition, the first driving unit may include fifth and sixth coils not being overlapped with the first to fourth magnets in an optical axis direction.

A camera module according to an aspect of the present invention for achieving the above object includes: a stator; a mover disposed in the stator; a first driving unit disposed on the stator; a second driving unit disposed on the mover and facing the first driving unit; a stiffener coupled to the stator and the mover; a substrate coupled to the stator and the mover and disposed on the stiffener; and a lens module coupled to the substrate, wherein a region of the substrate being overlapped with the stiffener may have the same shape as the stiffener.

A camera driving apparatus according to an aspect of the present invention for achieving the above other object may include: a rotor including a first round surface at the outer side corner and being moved by being provided with a first accommodating portion; a base including a second round surface corresponding to the first round surface at an inner side corner wherein the rotor is disposed spaced apart from the second accommodating portion; a ball disposed between the first round surface of the rotor and the second round surface of the base; a first driving unit being disposed on the rotor; and a second driving unit disposed in the base.

In addition, the direction of the first round surface or the direction of the second round surface may be a direction crossing the direction of the optical axis.

In addition, an area of the second round surface may be different from an area of the first round surface.

In addition, an area of the second round surface may be larger than an area of the first round surface.

In addition, it further includes a lens unit coupled to the first inner side accommodating portion of the rotor, wherein the rotor is movable integrally with the lens unit by the first driving unit and the second driving unit.

In addition, the lens unit is rotationally moved along the first round surface and the second round surface with respect to the optical axis, and the lens unit may be moved by tilting vertically and horizontally with respect to the optical axis along the first round surface and the second round surface.

In addition, the rotor may include a ball accommodating portion on which the ball is disposed.

In addition, it may further include an upper spring disposed in contact with the upper side of the base and the rotor.

In addition, it further includes a circuit board disposed below the base and controlling the driving unit, wherein the circuit board includes a rigid circuit board and a flexible circuit board, and a portion of the flexible circuit board may be disposed below the rotor.

In addition, it further includes an upper spring disposed on the rotor and the base, wherein the upper spring may include an outer side support, a spring portion connected to the inner side of the outer side support part, and an inner side support portion connected to the inner side of the spring portion.

In addition, the outer side support portion is fixed to the base, and the inner side support portion may be fixed to the rotor.

A camera module according to an aspect of the present invention for achieving the above other object may include any one of the above-mentioned camera driving devices.

Advantageous Effects

Through the present embodiment, it is possible to provide a camera module capable of reducing the size of a product.

In addition, there is a technical effect that can provide excellent OIS function without image distortion even when photographing a video, and since it is a method in which the entire module including the lens and image sensor is being moved, the correction range is wider than that of a lens shift method and since the optical axis of the lens and the axis of the image sensor do not shift, there is a unique technical effect without image distortion by minimizing image deformation.

Furthermore, there is a technical effect of providing an excellent OIS function without image distortion and a technical effect of providing a miniature camera module at the same time.

BRIEF DESCRIPTION OF DRAWINGS

FIG. 14b is an exploded perspective view of a camera module according to a second embodiment of the present invention illustrated in FIG. 14a.

FIG. 15b is an exploded perspective view of an actuator in a camera module according to a second embodiment of the present invention illustrated in FIG. 15a.

FIG. 15c is a detailed view of an upper spring in a camera module according to a second embodiment of the present invention illustrated in FIG. 15a.

BEST MODE

Figure 1:
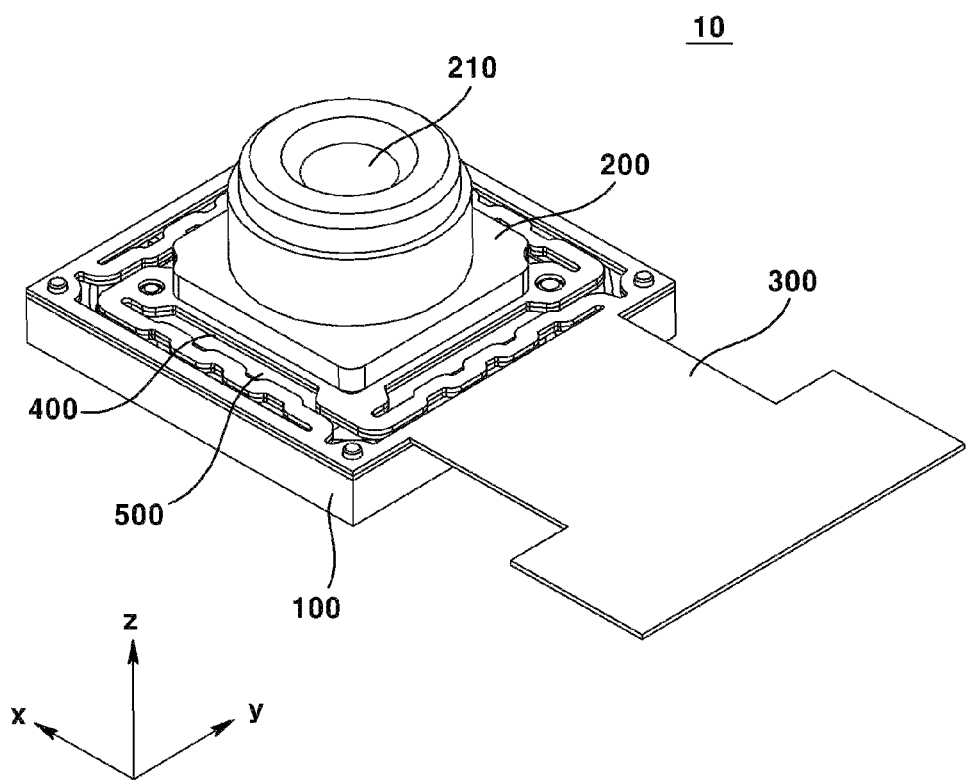
FIG. 1 is a perspective view of a camera module according to a first embodiment of the present invention.

Hereinafter, preferred embodiments of the present invention will be described in detail with respect to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

The 'optical axis direction' used below is defined as the optical axis direction of the lens module. Meanwhile, 'optical axis direction' may correspond to 'up and down direction', 'z axis direction' and the like.

The 'handshake correction function' used below is defined as a function of moving or tilting the lens in a direction perpendicular to the optical axis direction to cancel vibration (movement) generated in the image sensor by an external force. Meanwhile, 'handshake correction' can be interchangeably used with 'optical image stabilization (OIS)'.

Hereinafter, the present invention will be described in more detail with respect to the accompanying drawings.

Figure 2:
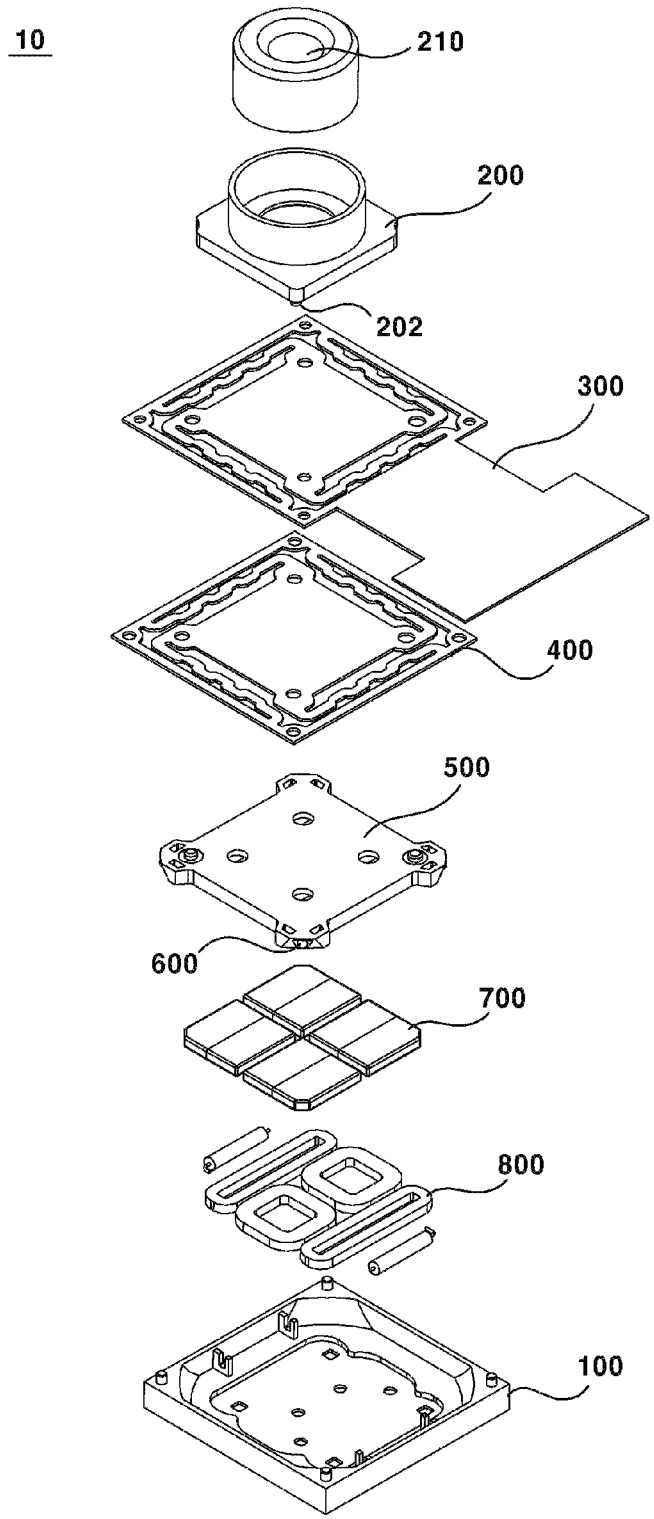
FIG. 2 is an exploded perspective view of a camera module according to a first embodiment of the present invention.
Figure 3:
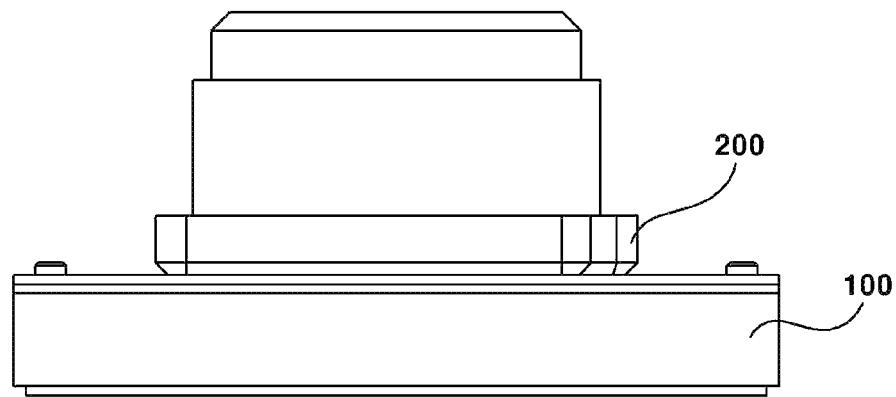
FIG. 3 is a side view of a camera module according to a first embodiment of the present invention.
Figure 4:
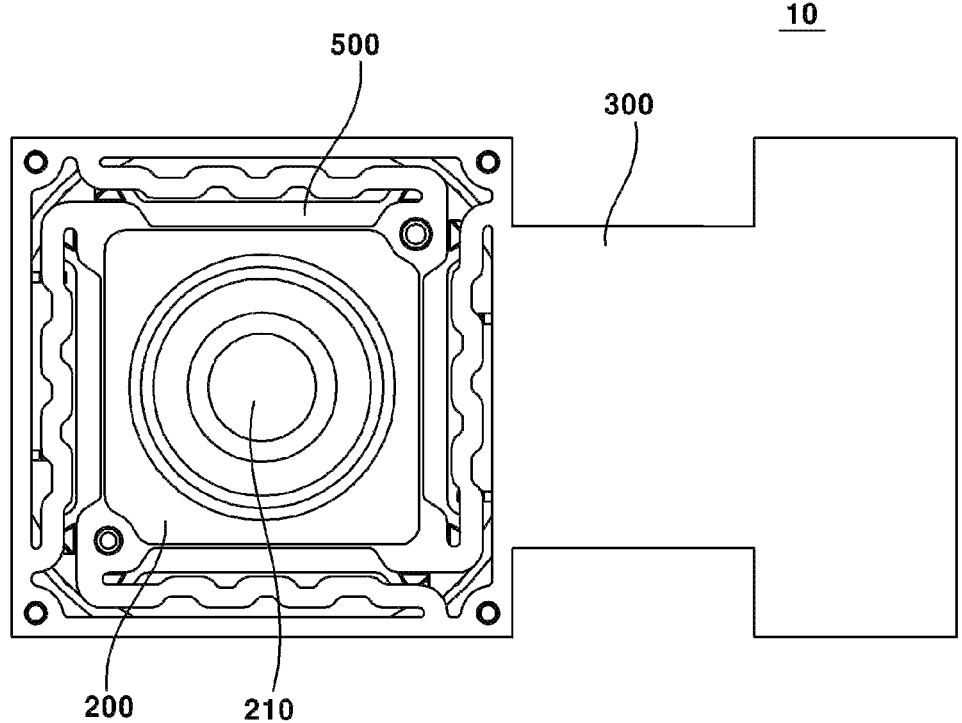
FIG. 4 is a plan view of a camera module according to a first embodiment of the present invention.
Figure 5:
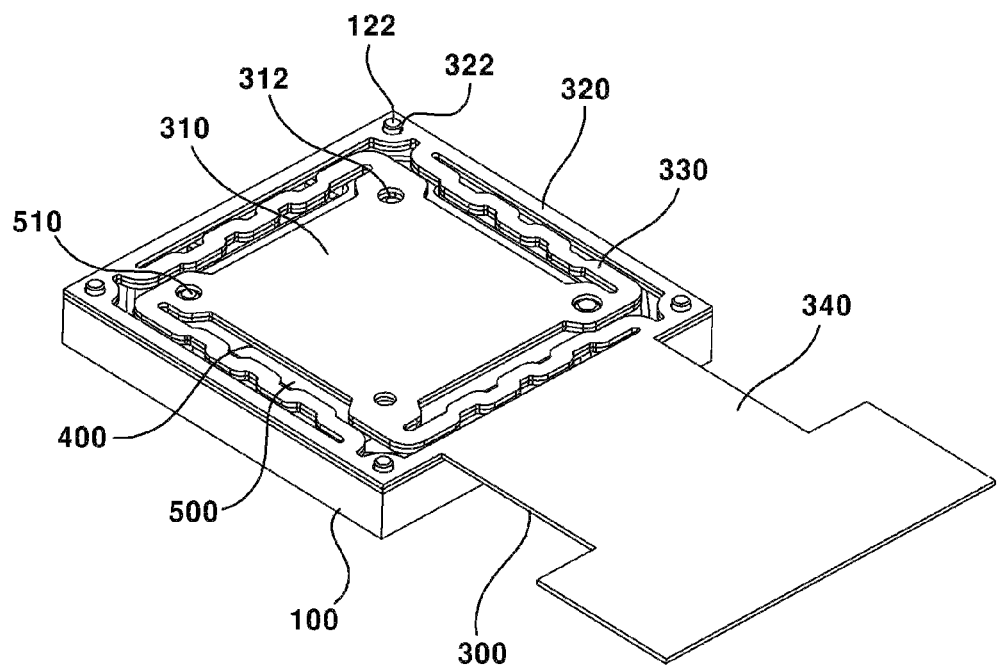
FIG. 5 is a perspective view with a lens module removed from a camera module according to a first embodiment of the present invention.
Figure 6:
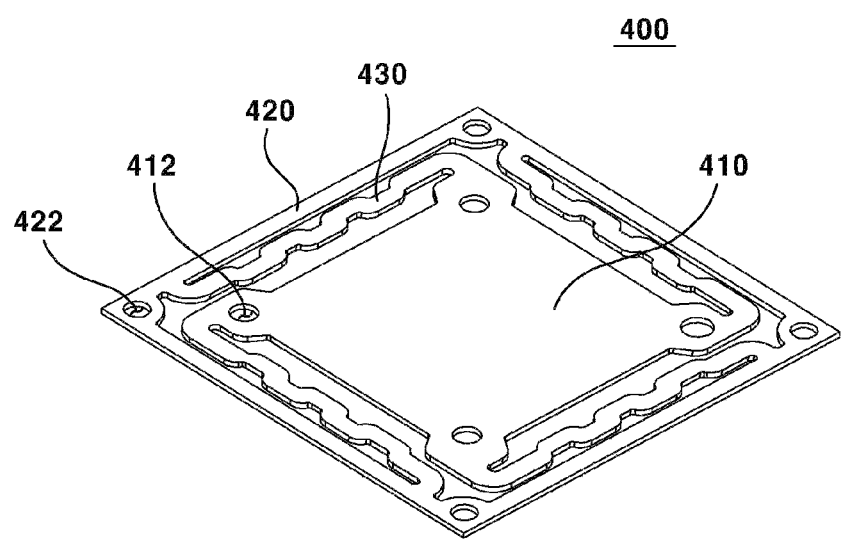
FIG. 6 is a perspective view of a stiffener of a camera module according to a first embodiment of the present invention.
Figure 7:
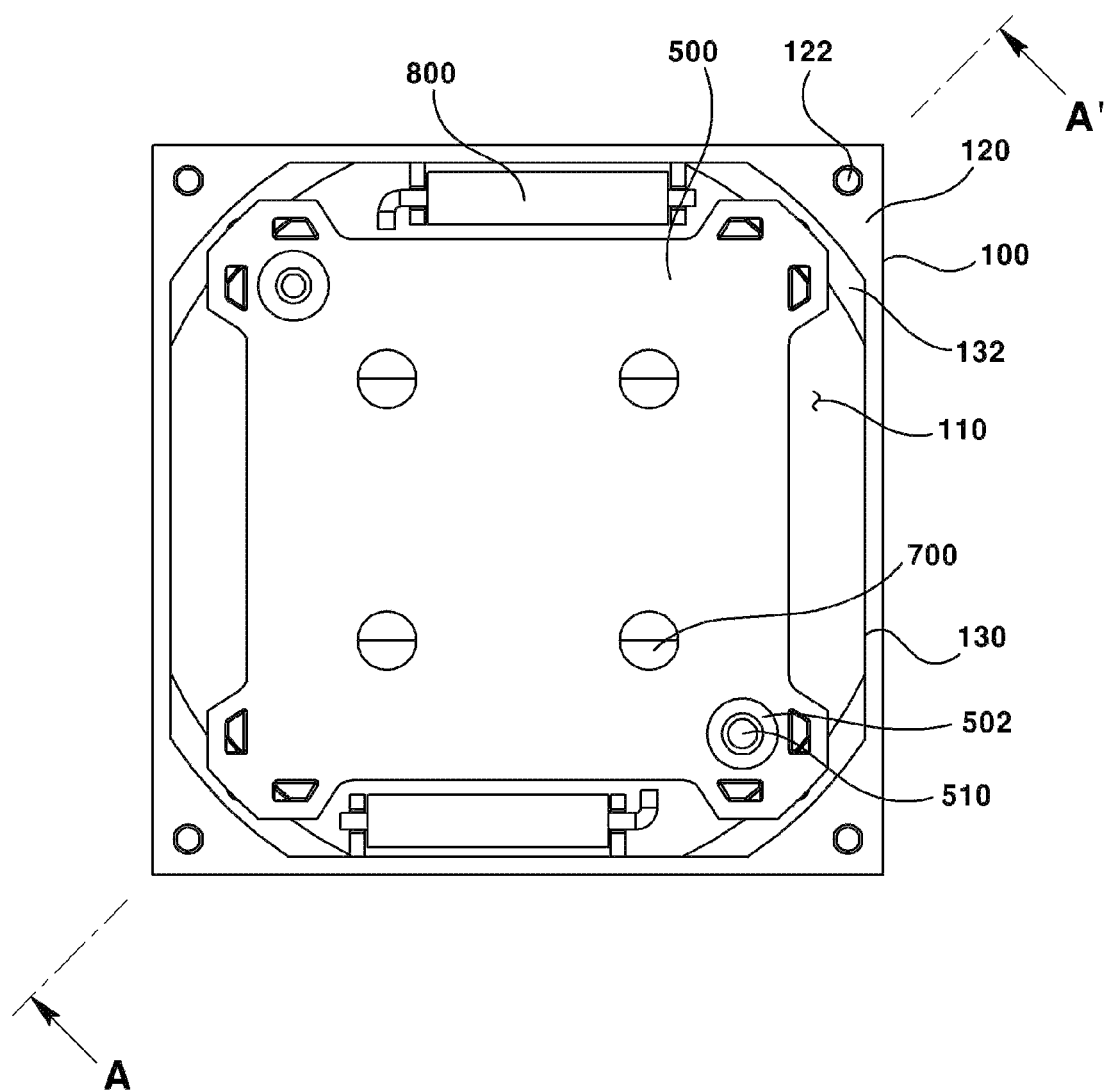
FIG. 7 is a plan view in which a lens module and a substrate are removed from FIG. 4.
Figure 8:
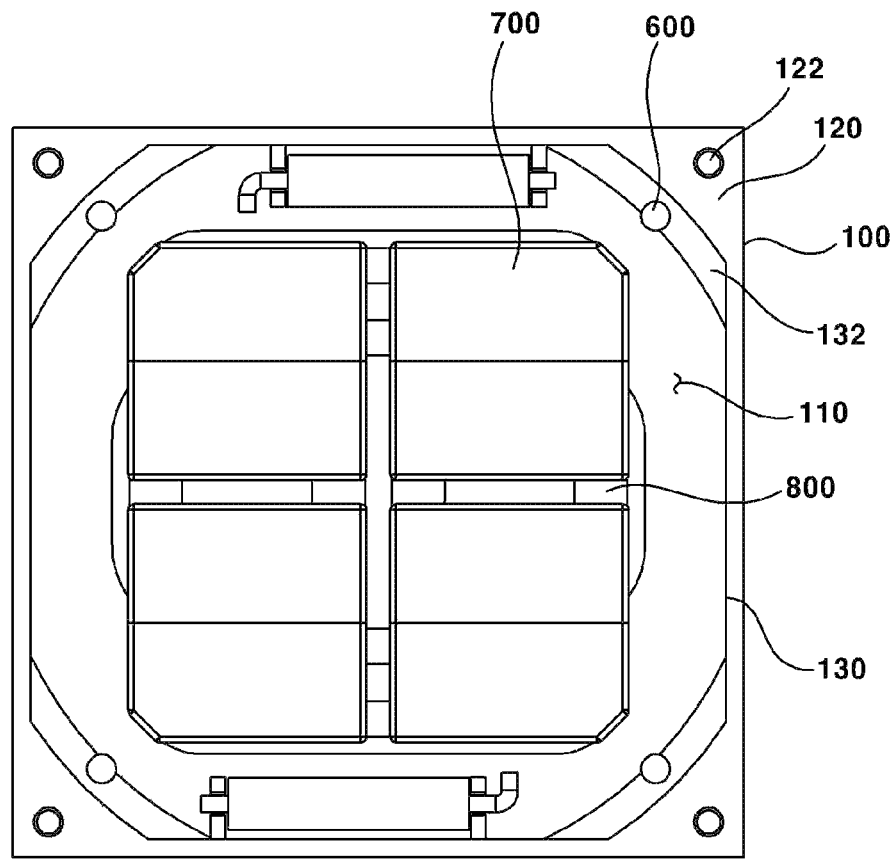
FIG. 8 is a plan view with a mover removed in FIG. 7.
Figure 9:
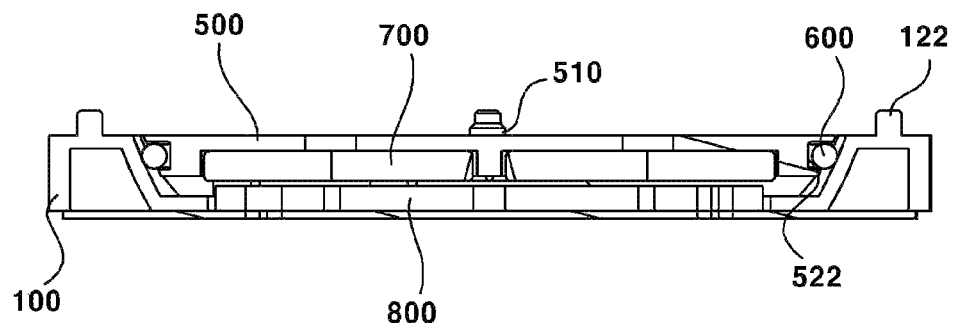
FIG. 9 is a cross-sectional view taken along line A-A' of FIG. 7.
Figure 10:
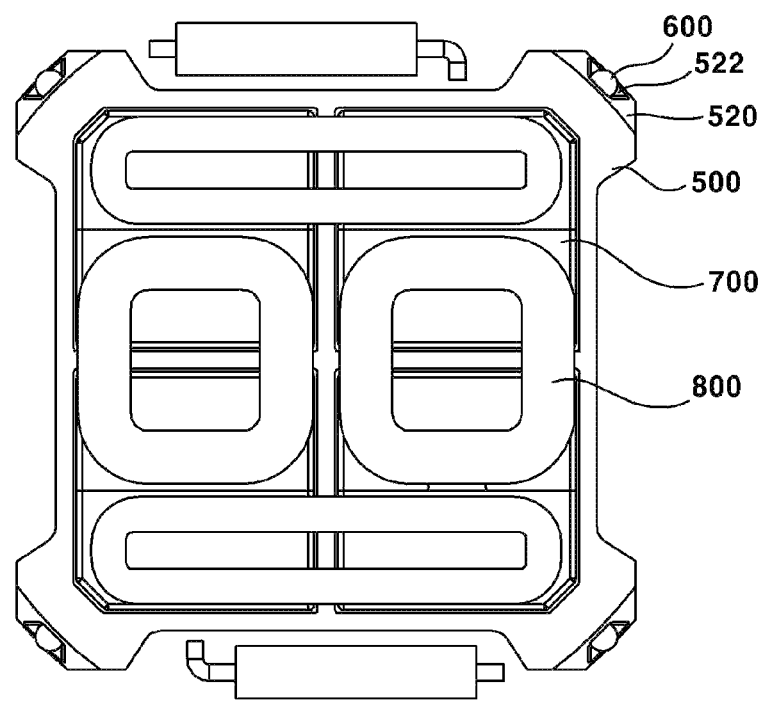
FIG. 10 is a bottom view of a partial configuration of a camera module according to a first embodiment of the present invention.
Figure 11:
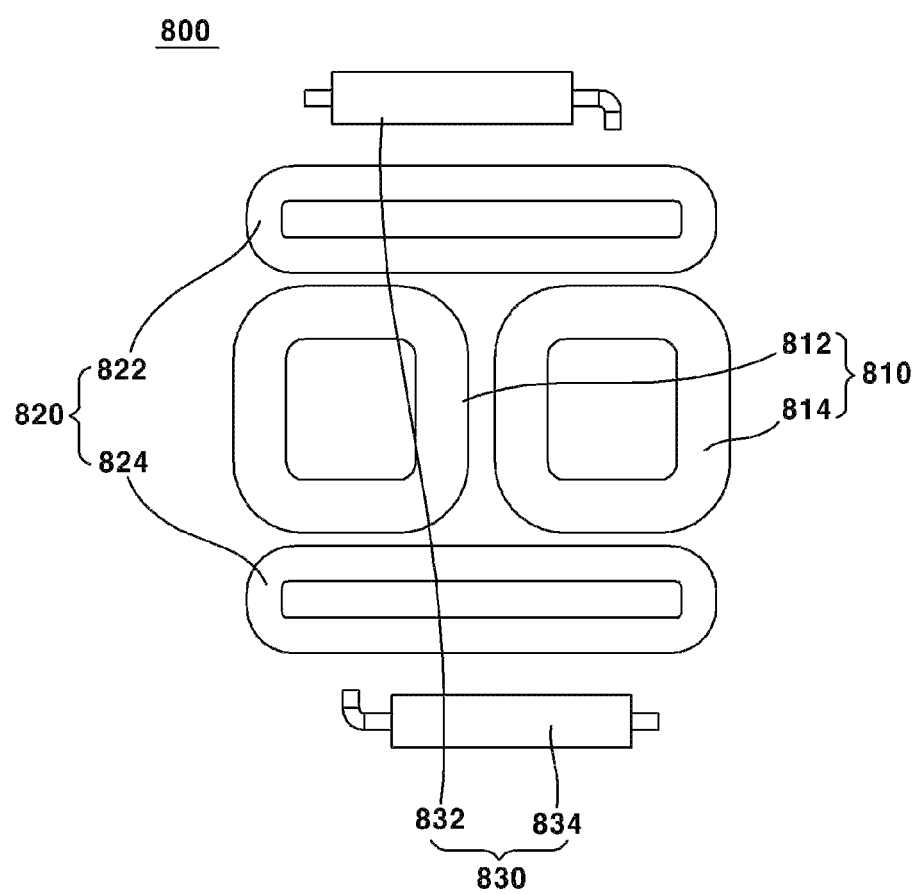
FIG. 11 is a plan view of a second driving unit of a camera module according to a first embodiment of the present invention.
Figure 12:
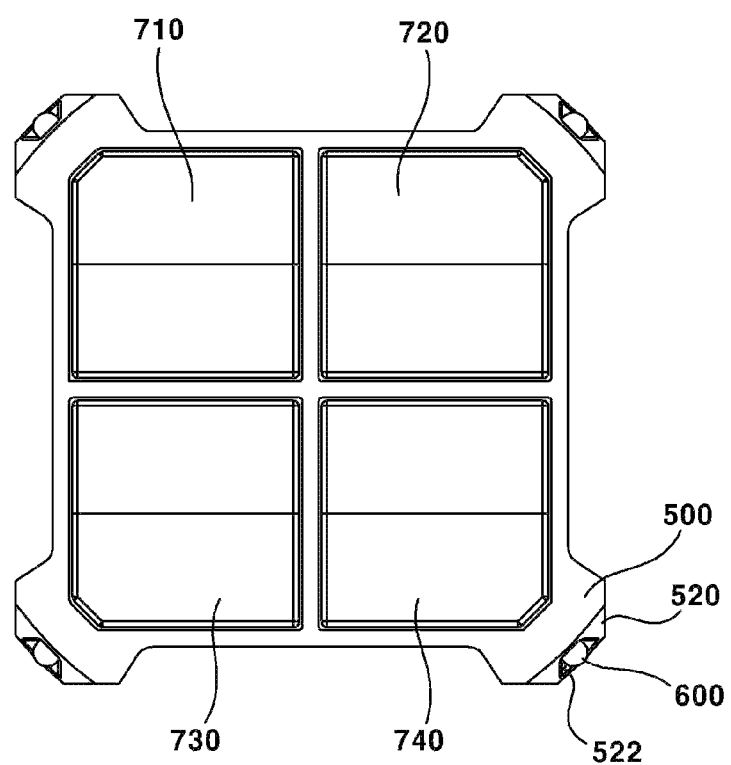
FIG. 12 is a bottom view with a second driving unit removed from FIG. 10.

FIG. 1 is a perspective view of a camera module according to a first embodiment of the present invention. FIG. 2 is an exploded perspective view of a camera module according to a first embodiment of the present invention. FIG. 3 is a side view of a camera module according to a first embodiment of the present invention. FIG. 4 is a plan view of a camera module according to a first embodiment of the present invention. FIG. 5 is a perspective view with a lens module removed from a camera module according to a first embodiment of the present invention. FIG. 6 is a perspective view of a stiffener of a camera module according to a first embodiment of the present invention. FIG. 7 is a plan view in which a lens module and a substrate are removed from FIG. 4. FIG. 8 is a plan view with a mover removed in FIG. 7. FIG. 9 is a cross-sectional view taken along line A-A' of FIG. 7. FIG. 10 is a bottom view of a partial configuration of a camera module according to a first embodiment of the present invention. FIG. 11 is a plan view of a second driving unit of a camera module according to a first embodiment of the present invention. FIG. 12 is a bottom view with a second driving unit removed from FIG. 10.

Referring to FIGS. 1 to 12, the camera module 10 according to the first embodiment of the present invention may include a stator 100, a lens module 200, a substrate 300, a stiffener 400, a mover 500, a guide ball 600, a second driving unit 700, and a first driving unit 800, but it may be implemented except for some of these configurations, and additional configurations are not excluded.

The camera module 10 may include a stator 100. The stator 100 may form the outer appearance of the camera module 10. The stator 100 may have a hexahedral shape with an open upper portion. Inside the stator 100, a mover 500, a guide ball 600, a second driving unit 700, and a first driving unit 800 may be disposed. A substrate 300 and a stiffener 400 may be coupled to the stator 100.

The stator 100 may include a second protruding portion 122. The second protruding portion 122 may be protruded upward from the upper surface of the stator 100. The second protruding portion 122 may be coupled to the substrate 300 and the stiffener 400. The second protruding portion 122 may be coupled to the outer side portion 420 of the stiffener 400 and the outer side elastic portion 320 of the substrate 300. The second protruding portion 122 can be inserted into the fourth coupling hole 422 of the outer side portion 420 of the stiffener 400 and the second coupling hole 322 of the outer side elastic portion 320 of the substrate 300. Adhesives such as epoxy may be placed between the second protruding portion 122 and the fourth coupling hole 422 of the outer side portion 420, and between the second protruding portion 122 and the second coupling hole 322 of the outer side elastic portion 320. The second protruding portion 122 may be inserted and fixed into the fourth coupling hole 422 of the outer side portion 420 and the second coupling hole 322 of the outer side elastic portion 320. An upper end of the second protruding portion 122 may be disposed higher than an upper end of the first protruding portion 510. Alternatively, the upper end of the first protruding portion 510 may be protruded higher than the upper end of the second protruding portion 122.

The mover 500 and the first driving unit 800 may be disposed in the inner space 110 of the stator 100. A region in contact with the guide ball 600 among the inner side surfaces 130 of the stator 100 may be formed as a curved surface 132. The curved surface 132 may be disposed in a corner region of the stator 100. The curved surface 132 may be disposed in each of the four corner regions of the stator 100. Through this, the guide ball 600 can guide the rotation based on the three different axes of the mover 500.

The camera module 10 may include a lens module 200. The optical axis of the lens module 200 may be aligned with an image sensor (not shown) formed on the substrate 300. The lens module 200 may be coupled to the substrate 300 and the stiffener 400. The lens module 200 may include a lens unit 210 including at least one lens for collecting images of an external subject. The lens unit 210 may be spaced apart from the substrate 300 in the optical axis direction. The lens unit 210 may be spaced apart from the image sensor of the substrate 300 in the optical axis direction.

When a region exposed to the outside in the lens module 200 is referred to as an upper surface, a protrusion 202 may be provided on the lower surface of the lens module 200 to be coupled to the substrate 300 and the stiffener. The lens module 200 may include a protrusion 202. The protrusion 202 may be protruded downward from a lower surface of the lens module 200. The protrusion 202 may be coupled to the substrate 300 and stiffener 400. The protrusion 202 may be coupled to the inner side elastic portion 310 of the substrate 300 and the inner side portion 410 of the stiffener 400. The protrusion 202 may be inserted into the first coupling hole 312 of the inner side elastic portion 310 of the substrate 300 and the second coupling hole 412 of the inner side portion 410 of the stiffener 400. An adhesive such as epoxy can be placed between the protrusion 202 and the first coupling hole 312 of the inner side elastic portion 310 and between the protrusion 202 and the second coupling hole 412 of the inner side portion 410. The protrusion 202 can be fixed by being inserted into the first coupling hole 312 of the inner side elastic portion 310 of the substrate 300 and the second coupling hole 412 of the inner side portion 410 of the stiffener 400.

The protrusion 202 may include a plurality of protrusions 202. The protrusion 202 may include two protrusions 202. The two protrusions 202 may be spaced apart from each other. Each of the two protrusions 202 may be formed in a shape corresponding to each other at positions symmetrical to each other with respect to the optical axis of the lens module 200. The two protrusions 202 may be spaced apart from the two first protruding portions 510. An angle between the virtual straight line connecting the two protrusions 202 and the virtual straight line connecting the two first protruding portions 510 may be a right angle.

The camera module 10 may include a substrate 300. The substrate 300 may include a printed circuit board (PCB). The substrate 300 may include a flexible printed circuit board (FPCB). The substrate 300 may be disposed on the stiffener 400. The substrate 300 may be coupled to the stator 100 and the mover 500. The lens module 200 may be disposed on the substrate 300. An image sensor (not shown) may be disposed on an upper surface or a front surface of the substrate 300. The optical axis of the image sensor and the optical axis of the lens module 200 may be aligned. The image sensor converts an image of a subject gathered in the lens module 200 into an electric signal to obtain a photographed object. In addition to the image sensor, a plurality of electronic components for driving may be mounted on the substrate 300.

Some regions of the substrate 300 may be overlapped with the stiffener 400 in an optical axis direction. The partial region of the substrate 300 may be formed in a shape corresponding to the stiffener 400. A portion of the substrate 300 corresponding to the stiffener 400 may serve as an elastic member. In this way, it is possible to reduce the number of components, thereby reducing the size of the product and reducing the cost. A region that is not overlapped with the stiffener 400 in the optical axis direction may be extended to the outside of the stator 100 and be electrically connected to the outside of the camera module 10. A region being overlapped with the stiffener 400 in the optical axis direction and a region not being overlapped with the substrate 300 may be disposed on the same plane.

The substrate 300 may include an inner side elastic portion 310 coupled to the mover 500, an outer side elastic portion 320 coupled to the stator 100, and a connecting elastic portion 330 connecting the inner side elastic portion 310 and the outer side elastic portion 320.

The substrate 300 may include an inner side elastic portion 310. The inner side elastic portion 310 may be disposed in a central region of the substrate 300. An image sensor may be disposed on the inner side elastic portion 310. The inner side elastic portion 310 may be overlapped with the inner side portion 410 in an optical axis direction. The inner side elastic portion 310 may be formed in a shape corresponding to the inner side portion 410. The inner side elastic portion 310 may be formed in a square plate shape. The inner side elastic portion 310 may include first to fourth corner regions. Each of the first to fourth corner regions may be disposed adjacent to each of the fifth to eighth corner regions of the outer side elastic portion 320.

The inner side elastic portion 310 may include a first coupling hole 312. The first coupling hole 312 may be overlapped with the third coupling hole 412 in an optical axis direction. The first coupling hole 312 may be formed to have a size corresponding to that of the third coupling hole 412. The inner side elastic portion 310 may be coupled to the mover 500. The first protruding portion 510 may be inserted into the first coupling hole 312 of the inner side elastic portion 310. The first protruding portion 510 may be inserted and fixed into the first coupling hole 312 of the inner side elastic portion 310. The inner side elastic portion 310 may be coupled to the lens module 200. A protrusion 202 may be inserted into the first coupling hole 312 of the inner side elastic portion 310. A protrusion 202 may be inserted and fixed into the first coupling hole 312 of the inner side elastic portion 310. The inner side elastic portion 310 may move integrally with the lens module 200, the inner side portion 410, and the mover 500.

The inner side elastic portion 310 may include a plurality of first coupling holes 312. The inner side elastic portion 310 may include four first coupling holes 312. The four first coupling holes 312 may be spaced apart from each other. The four first coupling holes 312 may be respectively disposed in a corner region of the inner side elastic portion 310. The first protruding portion 510 may be inserted into two of the four first coupling holes 312 and the protrusions 202 may be inserted into the remaining two.

The substrate 300 may include an outer side elastic portion 320. The outer side elastic portion 320 may be spaced apart from the edge region of the inner side elastic portion 310. The outer side elastic portion 320 may be formed in a rectangular ring shape. The outer side elastic portion 320 may be overlapped with the outer side portion 420 in an optical axis direction. The outer side elastic portion 320 may be formed in a shape corresponding to the outer side portion 420. The outer side elastic portion 320 may include fifth to eighth corner regions. Each of the fifth to eighth corner regions of the outer side elastic portion 320 may be disposed adjacent to each of the first to fourth corner regions of the inner side elastic portion 310.

The outer side elastic portion 320 may include a second coupling hole 322. The second coupling hole 322 may be overlapped with the fourth coupling hole 422 in an optical axis direction. The second coupling hole 322 may be formed to have a size corresponding to that of the fourth coupling hole 422. The outer side elastic portion 320 may be coupled to the stator 100. The second protruding portion 122 may be inserted into the second coupling hole 322 of the outer side elastic portion 320. The second protruding portion 122 may be inserted and fixed into the second coupling hole 322 of the outer side elastic portion 320. The outer side elastic portion 320 may be fixed to the upper surface 120 of the fixing unit 100.

The outer side elastic portion 320 may include a plurality of second coupling holes 322. The outer side elastic portion 320 may include four second coupling holes 322. The four second coupling holes 322 may be spaced apart from each other. The four second coupling holes 322 may be respectively disposed in a corner region of the outer side elastic portion 320. Four second protruding portions 122 may be respectively inserted into each of the four second coupling holes 322.

The substrate 300 may include a connecting elastic portion 330. The connecting elastic portion 330 may connect the inner side elastic portion 310 and the outer side elastic portion 320. The connecting elastic portion 330 may be overlapped with the connecting portion 430 in an optical axis direction. The connecting elastic portion 330 may be formed in a shape corresponding to the connecting portion 430. The connecting elastic portion 330 may be disposed in a space between the inner side elastic portion 310 and the outer side elastic portion 320. At least a portion of the connecting elastic portion 330 may be bent.

The connecting elastic portion 330 may include a plurality of connecting elastic portions 330. The connecting elastic portion 330 may include first to fourth connecting elastic portions. The first connecting elastic portion may connect the first corner region of the inner side elastic portion 310 and the sixth corner region of the outer side elastic portion 320. The second connecting elastic portion may connect the second corner region of the inner side elastic portion 310 and the seventh corner region of the outer side elastic portion 320. The third connecting elastic portion may connect the third corner region of the inner side elastic portion 310 and the eighth corner region of the outer side elastic portion 320. The fourth connecting elastic portion may connect the fourth corner region of the inner side elastic portion 310 and the fifth corner region of the outer side elastic portion 320.

The camera module 10 may include a stiffener 400. The stiffener 400 may have a higher rigidity than the substrate 300. The stiffener 400 may be disposed on the mover 500. The substrate 300 may be disposed on the stiffener 400. The stiffener 400 may be coupled to the stator 100 and the mover 500. The stiffener 400 may be overlapped with a partial region of the substrate 300 in an optical axis direction. The stiffener 400 may be formed in a shape corresponding to a partial region of the substrate 300. The stiffener 400 may be formed of a metal material. The stiffener 400 may be formed of a material heavier than the substrate 300. The stiffener 400 may include an outer side portion 420 coupled to the stator 100, an inner side portion 410 coupled to the mover 500, and a connecting portion 430 connecting the inner side portion 410 and the outer side portion 420. Through this, the stiffener 400 may serve to maintain the initial position of the mover 500 and at the same time serve as an elastic member.

The stiffener 400 may include an inner side portion 410. The inner side portion 410 may be disposed in the central region of the stiffener 400. The inner side portion 410 may be overlapped with the inner side elastic portion 310 in an optical axis direction. The inner side portion 410 may be formed in a shape corresponding to the inner side elastic portion 310. The inner side portion 410 may be formed in a square plate shape. The inner side portion 410 may include first to fourth corner regions. Each of the first to fourth corner regions may be disposed adjacent to each of the fifth to eighth corner regions of the outer side portion 420.

The inner side portion 410 may include a third coupling hole 412. The third coupling hole 412 may be overlapped with the first coupling hole 312 in an optical axis direction. The third coupling hole 412 may be formed to have a size corresponding to that of the first coupling hole 312. The inner side portion 410 may be coupled to the mover 500. The first protruding portion 510 may be inserted into the third coupling hole 412 of the inner side portion 410. The first protruding portion 510 may be inserted and fixed into the third coupling hole 412 of the inner side portion 410. The inner side portion 410 may be coupled to the lens module 200. A protrusion 202 may be inserted into the third coupling hole 412 of the inner side portion 410. A protrusion 202 may be inserted and fixed into the third coupling hole 412 of the inner side portion 410. The inner side portion 410 may be moved integrally with the lens module 200, the inner side portion 410, and the mover 500.

The inner side portion 410 may include a plurality of third coupling holes 412. The inner side portion 410 may include four third coupling holes 412. The four third coupling holes 412 may be spaced apart from each other. The four third coupling holes 412 may be disposed in a corner region of the inner side portion 410, respectively. The first protruding portion 510 may be inserted into two of the four third coupling holes 412, and the protrusions 202 may be inserted into the remaining two.

The stiffener 400 may include an outer side portion 420. The outer side portion 420 may be spaced apart from the edge region of the inner side portion 410. The outer side portion 420 may have an inner side portion 310 formed in a rectangular ring shape. The outer side portion 420 may be overlapped with the outer side elastic portion 320 in an optical axis direction. The outer side portion 420 may be formed in a shape corresponding to the outer side elastic portion 320. The outer side portion 420 may include fifth to eighth corner regions. Each of the fifth to eighth corner regions of the outer side portion 420 may be disposed adjacent to each of the first to fourth corner regions of the inner side portion 410.

The outer side portion 420 may include a fourth coupling hole 422. The fourth coupling hole 422 may be overlapped with the second coupling hole 322 in an optical axis direction. The fourth coupling hole 422 may be formed to have a size corresponding to that of the second coupling hole 322. The outer side portion 420 may be coupled to the stator 100.

The second protruding portion 122 may be inserted into the fourth coupling hole 422 of the outer side portion 420. The second protruding portion 122 may be inserted and fixed into the fourth coupling hole 422 of the outer side portion 420. The outer side portion 420 may be fixed to the upper surface 120 of the fixing unit 100.

The outer side portion 420 may include a plurality of fourth coupling holes 422. The outer side portion 420 may include four fourth coupling holes 422. The four fourth coupling holes 422 may be spaced apart from each other. The four fourth coupling holes 422 may be respectively disposed in a corner region of the outer side portion 420. Four second protruding portions 122 may be respectively inserted into each of the four fourth coupling holes 422.

The stiffener 400 may include a connecting portion 430. The connecting portion 430 may connect the inner side portion 410 and the outer side portion 420. The connecting portion 430 may be overlapped with the connecting elastic portion 330 in an optical axis direction. The connecting portion 430 may be formed in a shape corresponding to the connecting elastic portion 330. The connecting portion 430 may be disposed in a space between the inner side portion 410 and the outer side portion 420. At least a portion of the connecting portion 430 may be bent.

The connecting portion 430 may include a plurality of connecting portions 430. The connecting portion 430 may include first to fourth connecting elastic portions. The first connecting elastic portion may connect the first corner region of the inner side portion 410 and the sixth corner region of the outer side portion 420. The second connecting elastic portion may connect the second corner region of the inner side portion 410 and the seventh corner region of the outer side portion 420. The third connecting elastic portion may connect the third corner region of the inner side portion 410 and the eighth corner region of the outer side portion 420. The fourth connecting elastic portion may connect the fourth corner region of the inner side portion 410 and the fifth corner region of the outer side portion 420.

The camera module 10 may include a mover 500. The mover 500 may be disposed inside the stator 100. The mover 500 may be disposed in an inner space 100 formed between the side surfaces of the stator 100. The mover 500 may be coupled to the substrate 300 and the stiffener 400. The mover 500 may be rotated together with the substrate 300 and the stiffener 400 with respect to the three different axes.

The mover 500 may include a groove 502 formed on an upper surface and a first protruding portion 510 protruding from the groove 502. The first protruding portion 510 may be protruded higher than the upper surface of the mover 500. An upper end of the first protruding portion 510 may be disposed lower than an upper end of the second protruding portion 122. Through this, it is possible to limit the range in which the mover 500 can be rotated. The first protruding portion 510 of the mover 500 may be coupled to the inner side elastic portion 310 of the substrate 300 and the inner side portion 410 of the stiffener 400. The first protruding portion 510 may be inserted into the first coupling hole 312 of the inner side elastic portion 310 of the substrate 300 and the third coupling hole 412 of the inner side portion 410 of the stiffener 400. Adhesives such as epoxy may be placed between the first protruding portion 510 and the first coupling hole 312 of the inner side elastic portion 310 and between the third coupling hole 412 of the first protruding portion 510 and the inner side portion 410. An adhesive such as epoxy may be placed between the groove 502 of the mover 500 and the lower surface of the stiffener 400. The first protruding portion 510 can be inserted into and fixed to the first coupling hole 312 of the inner side elastic portion 310 of the substrate 300 and the third coupling hole 412 of the inner side portion 410 of the stiffener 400.

The mover 500 may include a plurality of first protruding portions 510. The mover 500 may include two first protruding portions 510. The two first protruding portions 510 may be spaced apart from each other. Each of the two first protruding portions 510 may be formed have a shape corresponding to each other in a position symmetrical to each other with respect to the optical axis of the lens module 200. The two first protruding portions 510 may be disposed spaced apart from the two protrusions 202. An angle formed by a virtual straight line connecting the two first protruding portions 510 and a virtual straight line connecting the two first protrusions 202 may be a right angle.

The mover 500 may include a seating groove 522 formed on the outer side surface. A region in which the seating groove 522 is disposed among the outer side surfaces of the mover 500 may be formed as a curved surface 520. The curved surface 520 region of the mover 500 and the seating groove 522 may be formed at a position facing the curved surface 132 region of the stator 100. The seating groove 522 of the mover 500 may have a guide ball 600 disposed between the curved surface 132 region of the stator 100. At least a portion of the guide ball 600 may be seated in the seating groove 522 of the mover 500. The inner side surface of the seating groove 522 of the mover 500 may be formed in a curved shape. Through this, the guide ball 600 can guide the rotation with respect to the three different axes of the mover 500. Four of the curved surface 520 regions and seating groove 522 of the mover 500 may be formed in each corner region of the mover 500.

The camera module 10 may include a guide ball 600. The guide ball 600 may be disposed between the stator 100 and the mover 500. The guide ball 600 may be formed in a spherical shape. A cross-section of the guide ball 600 may be formed in an elliptical shape. The guide ball 600 may be disposed between a corner region of the inner side surface 130 of the stator 100 and a corner region of the mover 500. At least a portion of the guide ball 600 may be disposed in the seating groove 522. The guide ball 600 makes it possible to guide the rotation with respect to the three different axes of the mover 500 with respect to the stator 100.

The camera module 10 may include a second driving unit 700. The second driving unit 700 may be disposed on the mover 500. The second driving unit 700 may be disposed at a lower portion of the mover 500. The second driving unit 700 may be disposed on a lower surface of the mover 500. The second driving unit 700 may face the first driving unit. The second driving unit 700 enables the mover 500 to be rotated with respect to the three different axes with respect to the stator 100 through electromagnetic interaction with the first driving unit 800.

The second driving unit 700 may include first to fourth magnets 710, 720, 730, and 740. The first to fourth magnets 710, 720, 730, and 740 may have a 2×2 arrangement. For example, the second magnet 720 is disposed on the right side of the first magnet 710, the third magnet 730 is disposed below the first magnet 710, and the fourth magnet 740 may be disposed on a diagonal line of the first magnet 710. Regions of the first magnet 710 and the third magnet 730 adjacent to each other may be magnetized to a first polarity. Regions of the first magnet 710 and the third magnet 730 spaced apart from each other may be magnetized to a second polarity.

Regions of the second magnet 720 and the fourth magnet 740 adjacent to each other may be magnetized to a first polarity. Regions of the second magnet 720 and the fourth magnet 740 spaced apart from each other may be magnetized to a second polarity. In the first embodiment of the present invention, the first to fourth magnets 710, 720, 730, and 740 are described as an example that they have the same size as each other, but the first to fourth magnets 710, 720, 730, and 740 may be of different sizes, or some of them may be of the same size.

A region magnetized to a first polarity among the first to fourth magnets 710, 720, 730, and 740 may face the first coil unit 810. A region magnetized to the first polarity among the first to fourth magnets 710, 720, 730, and 740 may be overlapped with the first coil unit 810 in an optical axis direction. Through electromagnetic interaction of a region magnetized to a first polarity among the first to fourth magnets 710, 720, 730, and 740 with the first coil unit 810, the mover 500 may be rotated with respect to a first axis.

A region among the first to fourth magnets 710, 720, 730, and 740 magnetized to a second polarity may face the second coil unit 820. A region magnetized to the second polarity among the first to fourth magnets 710, 720, 730, and 740 may be overlapped with the second coil unit 820 in an optical axis direction. Through electromagnetic interaction of the region magnetized to the second polarity among the first to fourth magnets 710, 720, 730, and 740 with the second coil unit 820, the mover 500 can be rotated with respect to a second axis perpendicular to the first axis.

The first to fourth magnets 710, 720, 730, and 740 may face the third coil unit 830. A region magnetized to a second polarity of the first to fourth magnets 710, 720, 730, and 740 may face the third coil unit 830. The first to fourth magnets 710, 720, 730, and 740 may not be overlapped with the third coil unit 830 in an optical axis direction. Through electromagnetic interaction of the first to fourth magnets 710, 720, 730, and 740 and the third coil unit 830, the mover 500 may be rotated with respect to a third axis perpendicular to the first axis and the second axis.

The camera module 10 may include a first driving unit 800. The first driving unit 800 may be disposed on the stator 100. The first driving unit 800 may be disposed on the bottom surface of the inner side surface of the stator 100. The first driving unit 800 may face the second driving unit 700. The first driving unit 800 may rotate the mover 500 with respect to the three different axes through electromagnetic interaction with the second driving unit 700. The first driving unit 800 may include a first coil unit 810, a second coil unit 820, and a third coil unit 830.

The first coil unit 810 may face a region magnetized to a first polarity among the first to fourth magnets 710, 720, 730, and 740. The first coil unit 810 may be overlapped with a region among the first to fourth magnets 710, 720, 730, and 740 magnetized to a first polarity in an optical axis direction. The first coil unit 810 may include a first coil 812 and a second coil 814. The first coil 812 and the second coil 814 may have sizes corresponding to each other. The first coil 812 and the second coil 814 may be formed in a rectangular ring shape. Through electromagnetic interaction of the first coil 812 and the second coil 814 with the region magnetized to a first polarity among the first to fourth magnets 710, 720, 730, and 740, the mover 500 can be rotated with respect to a first axis.

The second coil unit 820 may face a region magnetized to the second polarity among the first to fourth magnets 710, 720, 730, and 740. The second coil unit 820 may be overlapped with a region among the first to fourth magnets 710, 720, 730, and 740 magnetized to the second polarity in an optical axis direction. The second coil unit 820 may include a third coil 822 and a fourth coil 824. The third coil 822 may be disposed on one side of the first and second coils 812 and 814. The fourth coil 824 may be disposed on one side of the first and second coils 812 and 814. The third and fourth coils 822 and 824 may be formed in a rectangular ring shape. The lengths in a first direction of the third and fourth coils 822 and 824 are shorter than the lengths in a first direction of the first and second coils 812 and 814, and the lengths of the third and fourth coils 822 and 824 in a second direction perpendicular to the first direction may be longer than the lengths in a second direction of the first and second coils 812 and 814. Through electromagnetic interaction of a region among the first to fourth magnets 710, 720, 730, and 740 magnetized to a second polarity with the second coil unit 820 the mover 500 can be rotated with respect to a second axis perpendicular to the first axis.

The third coil unit 830 may face the first to fourth magnets 710, 720, 730, and 740. The third coil unit 830 may face a region of the first to fourth magnets 710, 720, 730, and 740 magnetized to a second polarity. The third coil unit 830 may not be overlapped with the first to fourth magnets 710, 720, 730, and 740 in an optical axis direction. The third coil unit 830 may include a fifth coil 832 and a sixth coil 834. The fifth coil 832 may be disposed on one side of the third coil 822. The sixth coil 834 may be disposed on the other side of the fourth coil 824. The fifth coil 832 may be disposed to face the regions of the first and second magnets 710 and 720 magnetized to a second polarity. The sixth coil 834 may be disposed to face the regions of the third and fourth magnets 730 and 740 magnetized to a second polarity. Through the electromagnetic interaction of the third coil unit 830 with the first to fourth magnets 710, 720, 730, and 740, the mover 500 may be rotated with respect to a third axis perpendicular to the first axis and the second axis. The rotation angles of the first axis, the second axis, and the third axis may be between −1 degree and +1 degree, respectively, but is not limited thereto.

In a first embodiment of the present invention, a first axis may mean an x-axis, a second axis may mean a y-axis, and a third axis may mean a z-axis, but is not limited thereto.

According to a camera module 10 according to a first embodiment of the present invention, the lens module 300 and the image sensor disposed on the substrate may be rotated with respect to the three different axes to implement a handshake correction function. In this case, since it may serve as an elastic member through the material and/or structural characteristics of the substrate 300 and the stiffener 400, it is possible to reduce the size of the product and reduce the cost.

As described above, the camera module according to a first embodiment of the present invention has been described with respect to FIGS. 1 to 12. Hereinafter, a camera module according to a second embodiment of the present invention will be described with respect to FIGS. 13 to 23. The detailed description of the camera module according to a second embodiment of the present invention is based on the camera module and names, terms, and functions according to the first embodiment of the present invention and the detailed description of each embodiment, and it may be the same as or different from each other.

Figure 13A:
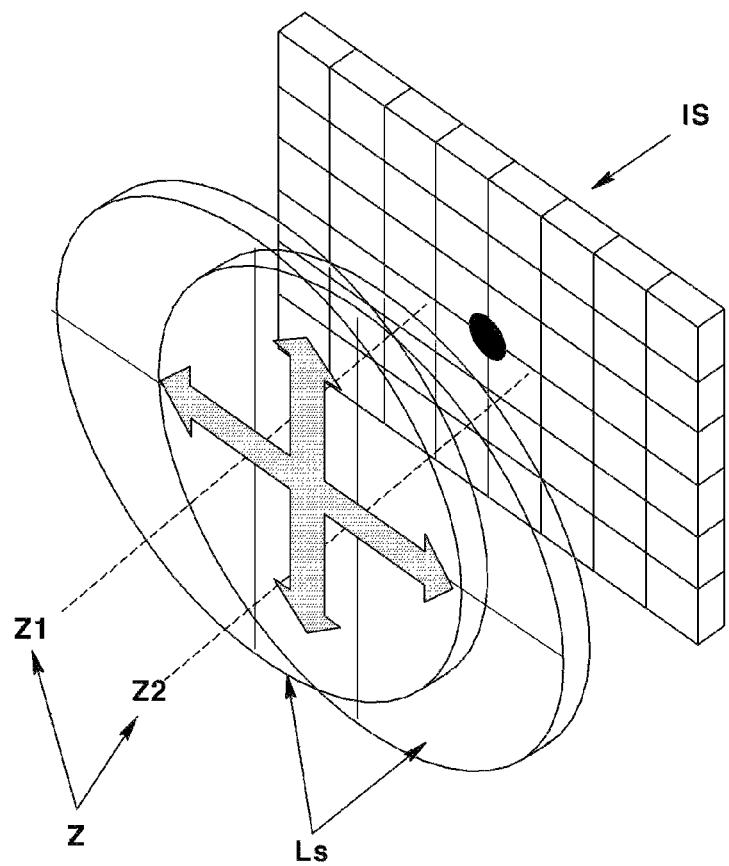
FIG. 13a is a conceptual diagram of OIS through a lens shift method in a conventional camera module.
Figure 13B:
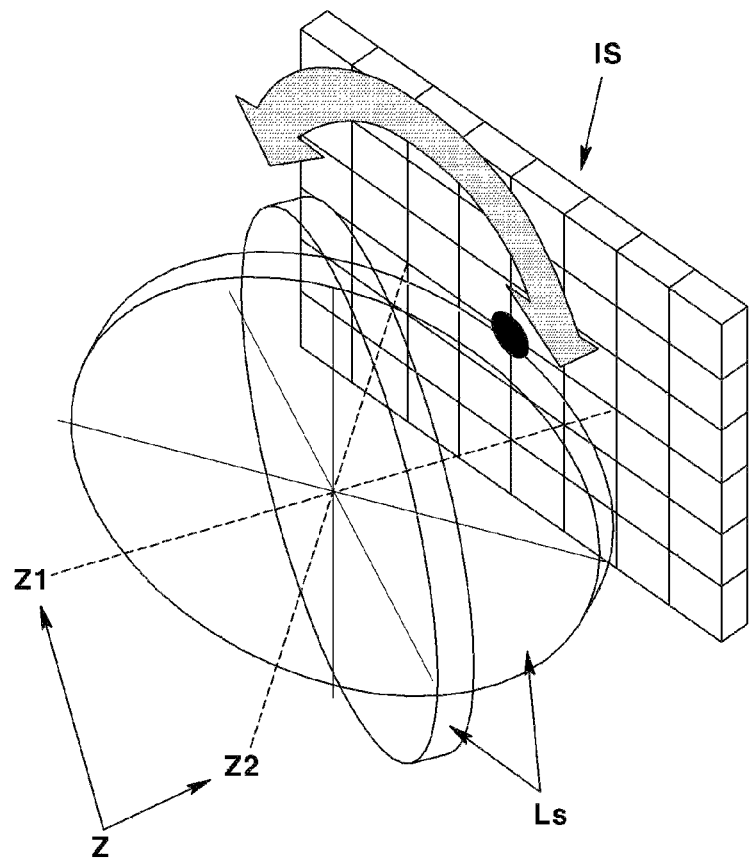
FIG. 13b is a conceptual diagram of OIS through a lens tilt method in a conventional camera module.

FIG. 13a is a conceptual diagram of OIS through a lens shift method in a conventional camera module, and FIG. 13b is a conceptual diagram of OIS through a lens tilt method in a conventional camera module.

Referring to FIG. 13a, in the case of the conventional lens shift method, according to the movement of the lens Ls, as the optical axis Z, which is the reference of the point with the highest spatial resolution value in the image sensor IS, is repeatedly moved from Z1 to Z2 and from Z2 to Z1, the distortion of the video become significant, and it is causing even nausea to users and others.

In addition, the problem of video distortion in the lens shift method is also occurring in the sensor shift method.

Next, referring to FIG. 13b, in the case of the conventional lens tilt method, the optical axis Z is repeatedly shifted from Z1 to Z2 according to the tilting of the lens Ls, and as a result, the distance between the lens Ls and the image sensor IS varies, and as the optical axis Z, which is the reference of the spatial resolution value, is repeatedly moved from Z1 to Z2 and from Z2 to Z1, distortion of the moving image become more significant.

The problem of video distortion in the lens tilt method is also a problem in the sensor tilt method.

Figure 14A:
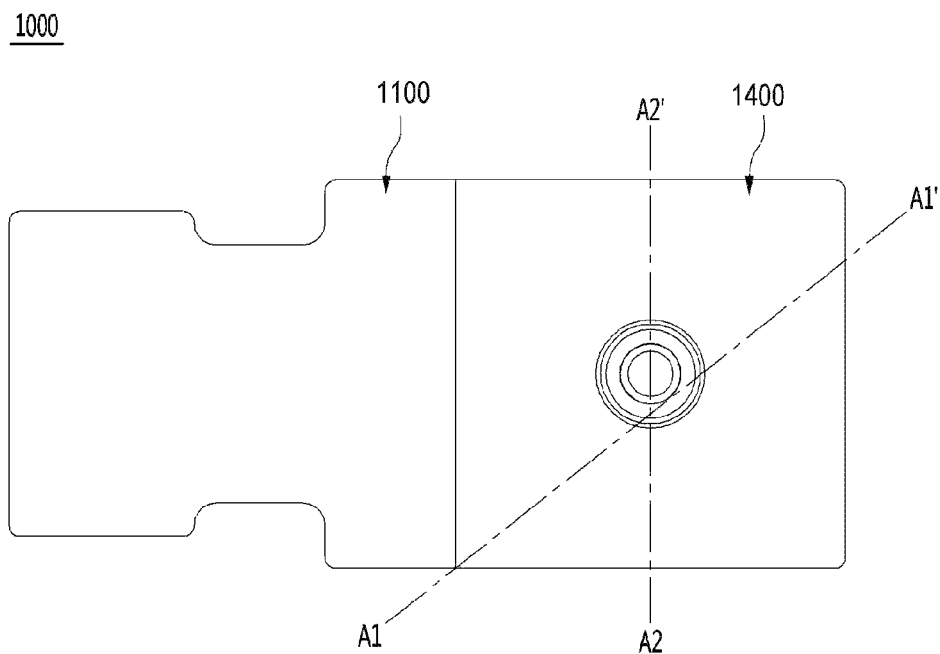
FIG. 14a is a plan view illustrating a camera module according to a second embodiment of the present invention.
Figure 14B:
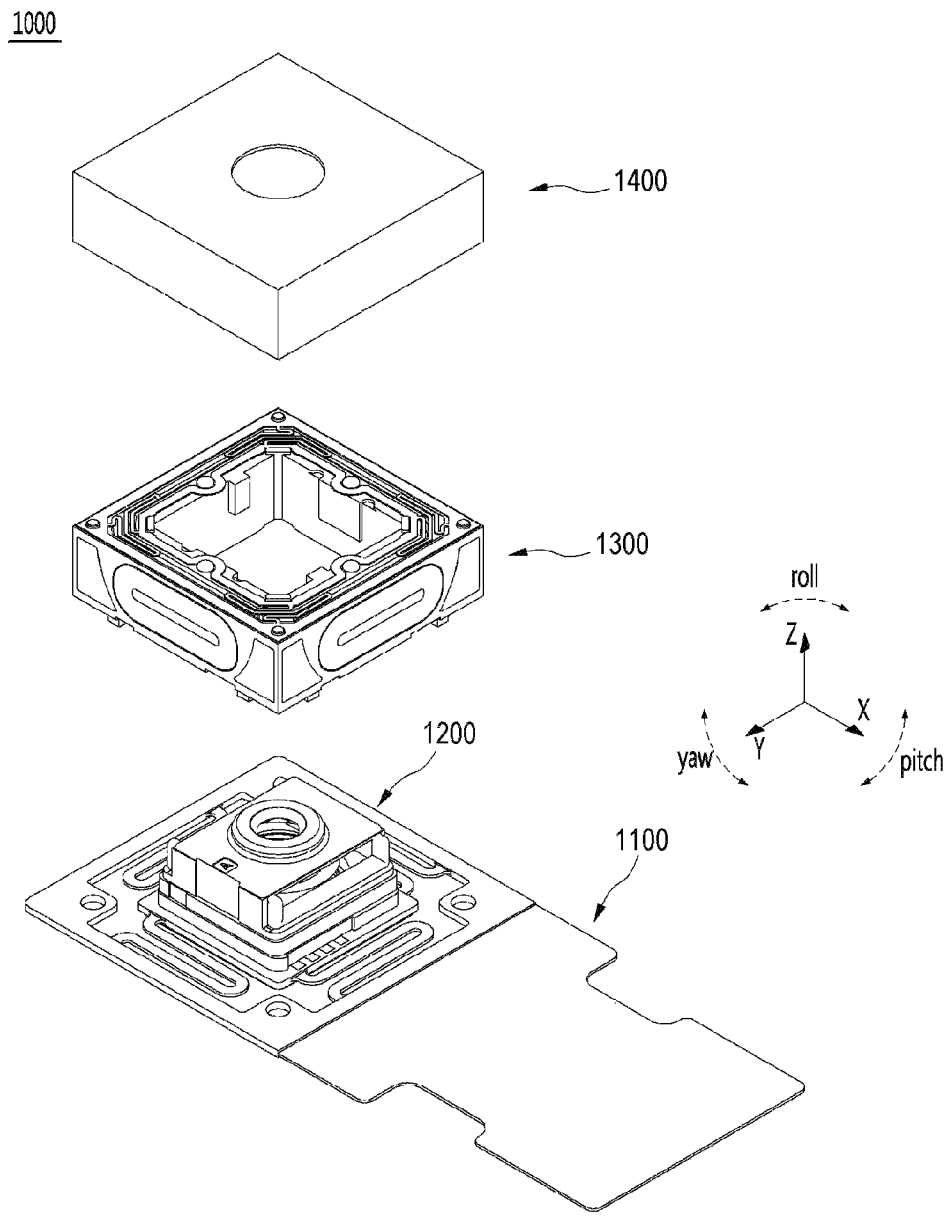

FIG. 14a is a plan view illustrating a camera module 1000 according to a second embodiment of the present invention, and FIG. 14b is an exploded perspective view of a camera module 1000 according to a second embodiment of the present invention illustrated in FIG. 14a.

Referring to FIGS. 14a and 14b, the camera module 1000 according to a second embodiment of the present invention may include any one or more of a sensor unit 1100, a lens unit 1200, an actuator 1300, and a cover 1400.

Referring to FIG. 14b, in an embodiment, a direction parallel to an optical axis of light may be referred to as a z-axis, a plane perpendicular to the optical axis may be referred to as an xy-plane, and in the xy-plane, the x-axis and the y-axis may be defined as directions mutually perpendicular to each other, but is not limited thereto. At this time, the x-axis may be defined as a horizontal coordinate axis, and the y-axis may be defined as a vertical coordinate axis, but is not limited thereto.

The movement of a camera module may largely include a linear movement that moves along an axis and a rotational movement that rotates about the axis.

The above mentioned linear movement may include, as shown in FIG. 14b, a movement in a horizontal coordinate axis (x-axis) direction of the camera module, a movement in a vertical coordinate axis (y-axis) direction of the camera module, and a movement in an optical axis (z-axis) direction disposed along the front-rear direction of the camera module.

Next, the rotational movement, as shown in FIG. 14b, may include: pitch, which means a vertical rotational movement using the horizontal coordinate axis (x-axis) of the camera module as the rotation axis; yaw, which means a rotational movement in the left and right directions using the vertical coordinate axis (y-axis) of the camera module as the rotation axis; and roll, which means a rotational movement using the optical axis (z-axis) passing in the front-rear direction of the camera module as the rotation axis. The pitch and yaw may be rotations in the x-axis or y-direction.

The camera module according to the embodiment may be applied to the front or the rear, or both the bottom and the rear of the mobile phone.

Referring to FIG. 14b, in an embodiment, the lens unit 1200 and the actuator 1300 may be disposed inside the cover 1400. The cover 1400 may be referred to as a cover housing or a shield can. The cover 1400 may be formed of a metal material such as steel (SUS), and the like, and can shield electromagnetic waves flowing into and out of a camera module, and may also prevent the inflow of foreign substances into the camera module.

Figure 15A:
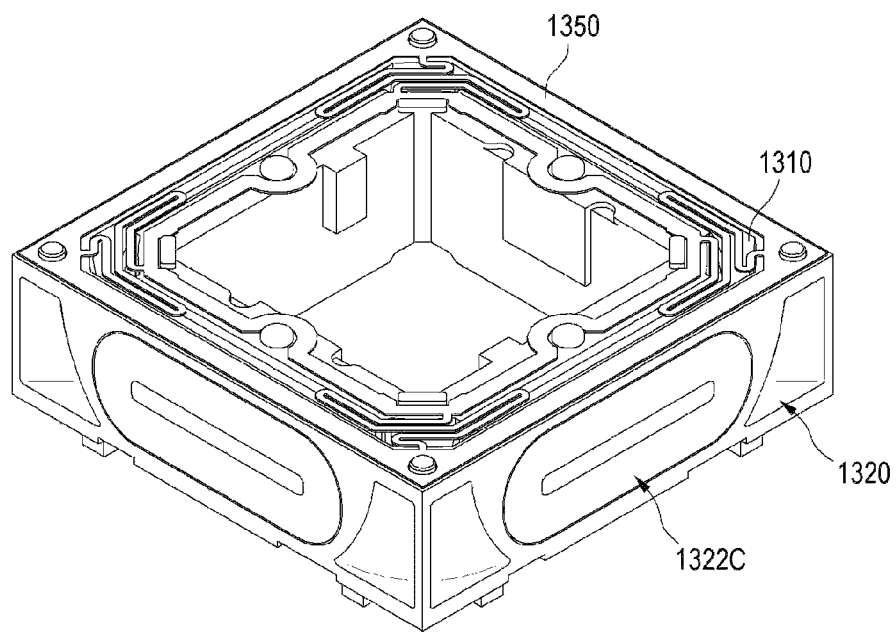
FIG. 15a is a perspective view of an actuator in a camera module according to a second embodiment of the present invention illustrated in FIG. 14b.
Figure 15B:
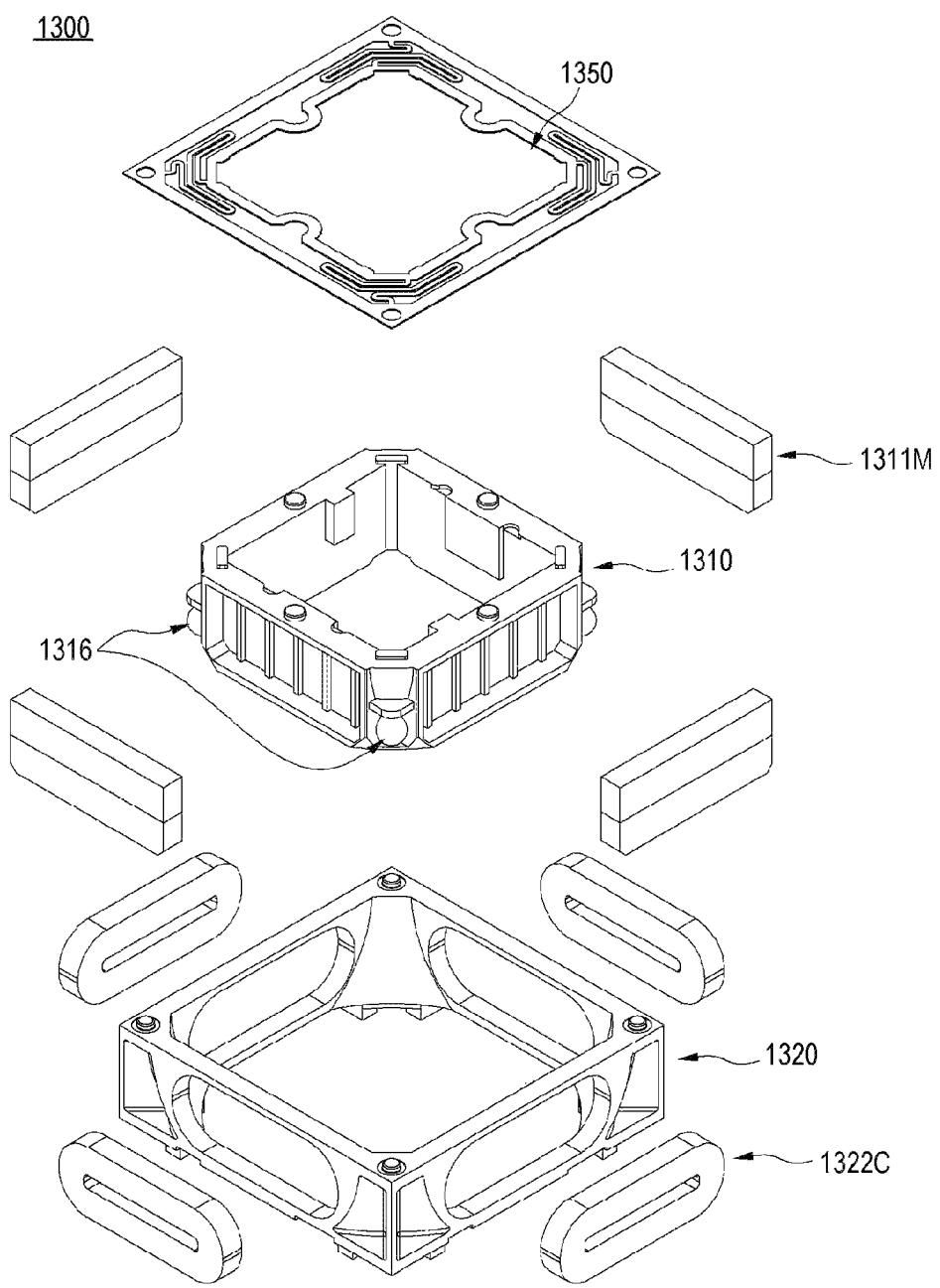

Next, FIG. 15a is a perspective view of an actuator 1300 in a camera module according to a second embodiment of the present invention illustrated in FIG. 14b, and FIG. 15b is an exploded perspective view of an actuator 1300 in a camera module according to a second embodiment of the present invention illustrated in FIG. 15a.

Referring to FIGS. 15a and 15b, in a camera module according to a second embodiment of the present invention, the actuator 1300 may include a rotor 1310, a base 1320 on which the rotor 1310 is disposed, a ball 1316 disposed between the rotor 1310 and the base 1320, a first driving unit 1311M disposed in the rotor 1310, and a second driving unit 1322C disposed in the base 1320.

In addition, in a camera module according to a second embodiment of the present invention, the actuator 1300 may include an upper spring 1350 disposed in contact with the base and an upper side of the rotor.

Figure 15C:
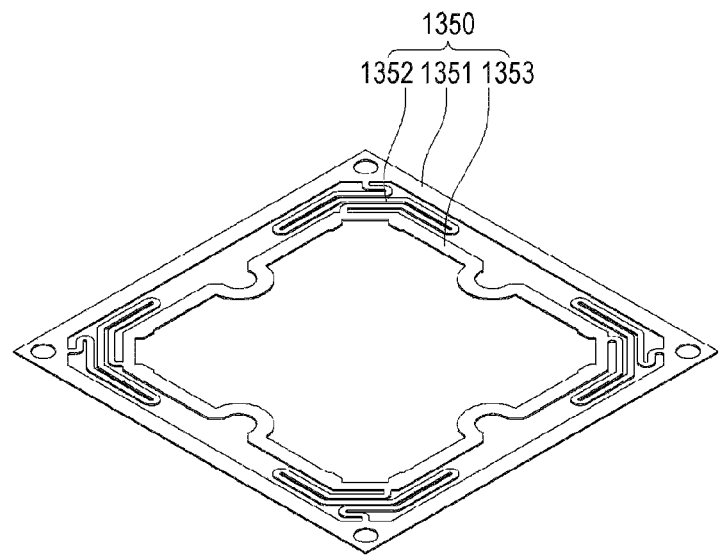
Figure 16:
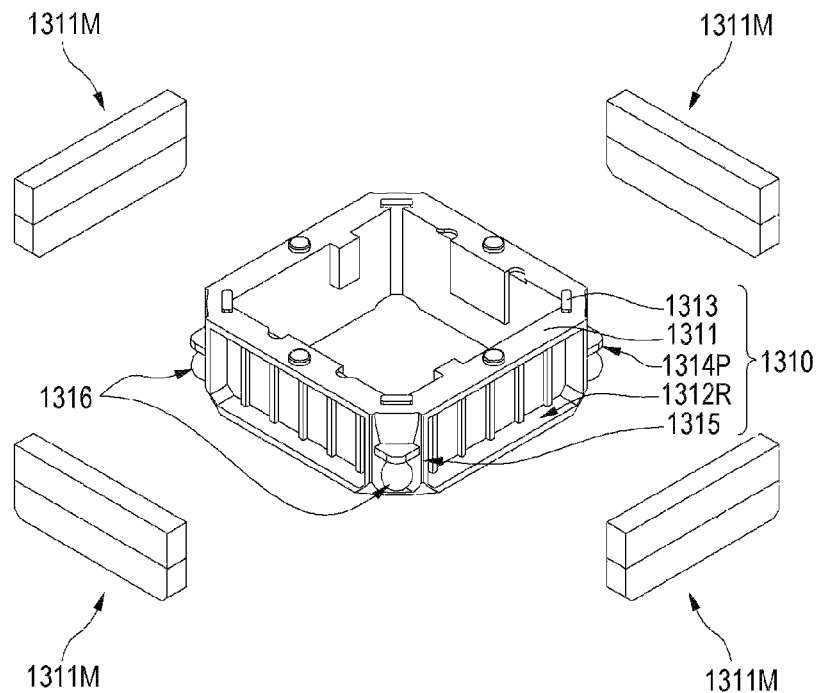
FIG. 16 is a perspective view of a rotor and a first driving unit in an actuator illustrated in FIG. 15b.
Figure 17:
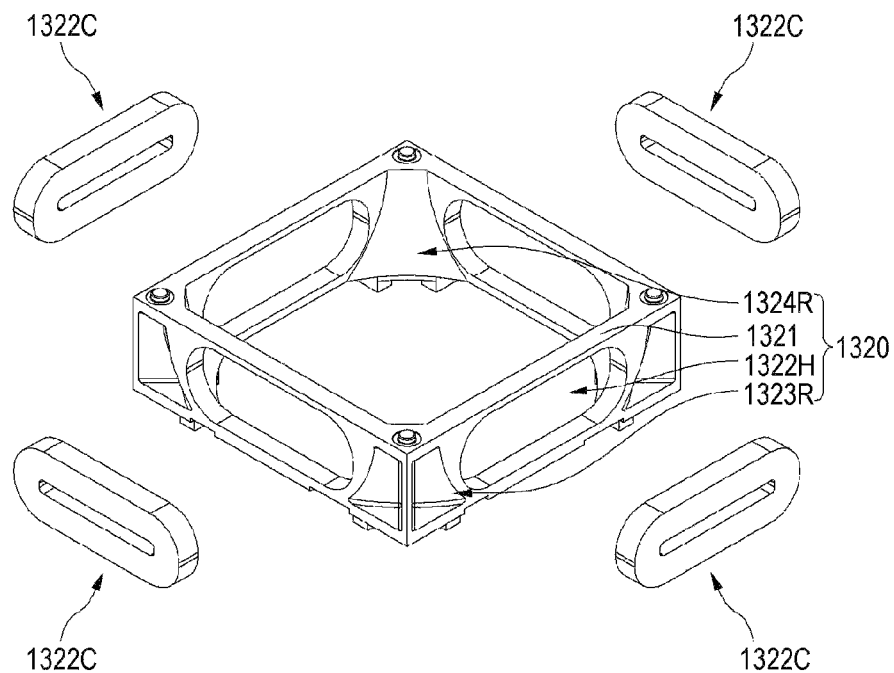
FIG. 17 is a perspective view of a base and a second driving unit in an actuator illustrated in FIG. 15b.

For example, FIG. 15c is a detailed view of an upper spring 1350 in a camera module according to a second embodiment of the present invention illustrated in FIG. 15a, FIG. 16 is a perspective view of a rotor 1310 and a first driving unit 1311M in an actuator illustrated in FIG. 15b, and FIG. 17 is a perspective view of a base 1320 and a second driving unit 1322C in an actuator illustrated in FIG. 15b.

First, the upper spring 1350 will be described with respect to FIGS. 15c and 15a.

The rotor 1310 and the base 1320 may be connected by the upper spring 1350, and an initial position of the lens unit 1200 may be set through a preload of the upper spring 1350.

The upper spring 1350 may include an outer side support part 1351, a spring part 1352, and an inner side support part 1353.

For example, the upper spring 1350 may include an outer side support part 1351, a spring part 1352 connected to an inner side of the outer side support part 1351, and an inner side support part 1353 connected to the inner side of the spring part 1352.

The outer side support part 1351 may be fixed to the base 1320, and the inner side support part 1353 may be fixed to the rotor 1310.

Meanwhile, in another embodiment, the initial position of the lens unit 1200 may be set between the rotor 1310 and the base 1320 by a predetermined magnetic force.

In addition, in an embodiment, an open loop driving method may be performed using the upper spring 1350.

Next, FIG. 16 is a perspective view of a rotor 1310 and a first driving unit 1311M in an actuator illustrated in FIG. 15b, and FIG. 17 is a perspective view of a base 1320 and a second driving unit 1322C in an actuator illustrated in FIG. 15b.

The camera driving device of an embodiment may include a rotor 1310 supporting and driving the lens unit 1200, a base 1320 accommodating the rotor 1310, a first driving unit 1311M driving the rotor 1310, and a second driving unit 1322C.

The camera driving device may make the lens unit 1200 being coupled to the rotor 1310 move pitch, yaw, and roll with respect to x, y, and z axes.

For example, the rotor 1310 supports the lens unit 1200 and the configuration of the first driving unit 1311M, for example, a magnet, and the like, pitch, yaw, and roll operations may be performed together with the AF function of the lens unit 1200.

The base 1320 accommodates the rotor 1310 but may be a fixing unit for performing pitch, yaw, and roll operations of the lens unit 1200 through the rotor 1310.

Specifically, referring to FIG. 16, in an embodiment, the rotor 1310 may include a first accommodating portion therein, and the lens unit 1200 may be disposed on the first accommodating portion.

A ball accommodating portion 1315 may be provided at an outer side corner of the first bracket 1311 of the rotor 1310, and a ball 1316 may be disposed on the ball accommodating portion 1315.

For example, first protruding portions 1314P may be formed at four corners of the outer side of the first bracket 1311, ball accommodating portions 1315 may be secured by the first protruding portions 1314P, respectively, and a total of four balls 1316 can be placed, one each in the four corners of the outer side, but is not limited thereto.

In addition, in an embodiment, there is a technical effect in that the first protruding portion 1314P at the four corners of the outer side of the first bracket 1311 can perform the function of a stopper in the corner direction of the base 1320 or a shake fixing unit when the rotor 1310 is driven.

For example, in an embodiment, there are special technical effects in that the first protruding portion 1314P of the first bracket 1311 can perform the function of a stopper in the corner direction of the base 1320 or a shake fixing unit when the yaw or pitch of the rotor 1310 is driven.

Figure 21:
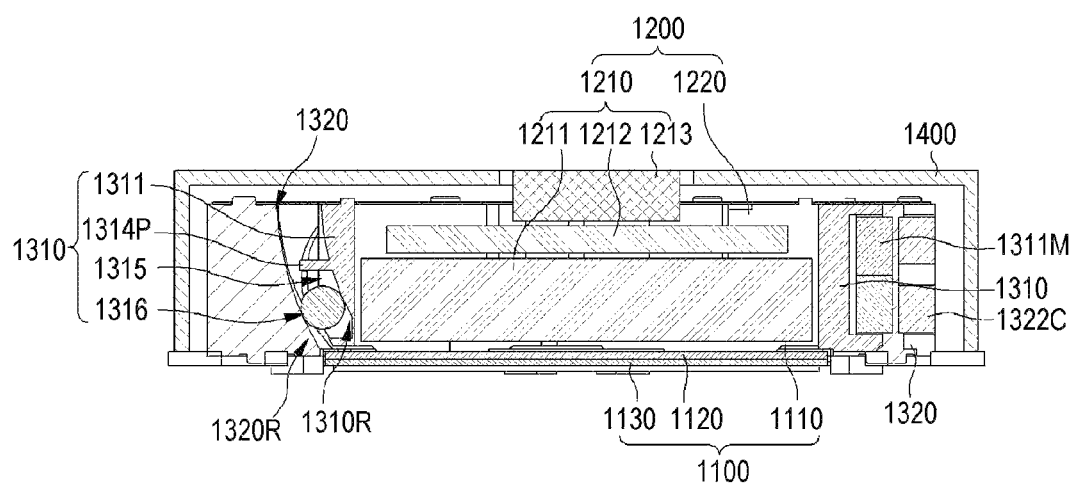
FIG. 21 is a cross-sectional view taken along line A1-A1' of a camera module according to an embodiment illustrated in FIG. 14*a*.

Referring momentarily to FIG. 21, in an embodiment the rotor 1310 has a ball accommodating portion 1315 at its outer side corner, the cross-section of the ball accommodating portion 1315 may include a first round surface 1310R.

Referring back to FIG. 16, next, a first coupling protrusion 1313 may be formed on an upper side of the first bracket 1311, and the first coupling protrusion 1313 can be fixed to the inner side support part 1353 of the upper spring 1350.

Next, the first bracket 1311 may have a first recess 1312R on an outer side of the sidewall. In addition, an embodiment may include a first driving unit 1311M disposed in the rotor 1310.

For example, the first bracket 1311 may include a first recess 1312R on an outer side of a sidewall, and a first driving unit 1311M may be disposed in the first recess 1312R. The first driving unit 1311M may be a magnet driving unit such as a permanent magnet, but is not limited thereto.

The first driving unit 1311M may be a magnet driving unit, and may be disposed on an outer side of the four side surfaces of the first bracket 1311.

One pair of the first driving units 1311M facing each other may be a pitch magnet, and the remaining pair facing each other may be a yaw magnet, but is not limited thereto.

Next, referring to FIG. 17, in an embodiment, the base 1320 includes a second round surface 1324R corresponding to the first round surface 1310R at an inner side corner, and a ball 1316 may be disposed between the first round surface 1310R of the rotor and the second round surface 1324R of the base.

The base 1320 accommodates the rotor 1310 but may be a fixing unit for performing pitch, yaw, and roll operations of the lens unit 1200 through the rotor 1310. To this end, the embodiment may include a second driving unit 1322C disposed in the base 1320. The second driving unit 1322C may be a coil driving unit.

For example, the second driving unit 1322C may include a second bracket 1321 and provided with a through hole 132211 passing through a sidewall of the first bracket 1321, and a second driving unit 1322C may be disposed in the through hole 132211.

One pair of the second driving units 1322C facing each other may be a pitch coil, and the remaining pair facing each other may be a yaw coil, but is not limited thereto.

In addition, in an embodiment, the base 1320 is provided with a second recess 1323R on the outside of the corner, so that precision injection is possible, and it can contribute to miniaturization, and the operation speed can be improved according to the weight reduction.

Figure 18:
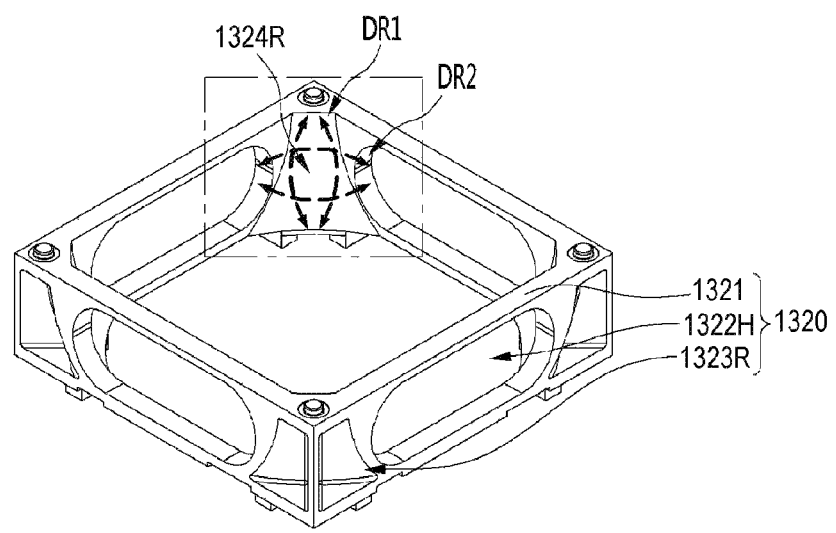
FIG. 18 is an exemplary view illustrating an operation of the base 1320 in the actuator illustrated in FIG. 15*b*.

Next, FIG. 18 is an exemplary view illustrating an operation of the base 1320 in the actuator illustrated in FIG. 15b.

The second round surface 1324R of the base 1320 of an embodiment may allow the ball 1316 to move by rolling in the first direction DR1 and the second direction DR2.

For example, the lens unit 1200 is rotationally moved along the first round surface 1310R and the second round surface 1324R with respect to the optical axis, and the lens unit 1200 may be moved by tilting vertically and horizontally with respect to the optical axis along the first round surface 1310R and the second round surface 1324R.

The embodiment is a tilting method of the entire module including the lens and the image sensor, and the correction range is wider than the lens movement method, and since the optical axis of the lens and the axis of the image sensor are not tilted, there is a unique technical effect of minimizing image distortion and eliminating image distortion.

Accordingly, according to the driving device of the camera module and the camera module including the same according to an embodiment, there is a technical effect that can provide an excellent OIS function without distortion of the image even when photographing a video.

In our previous technology, although a rotational driving of a lens is implemented, this previous technology is limited to a level at which rotational driving in one direction, such as a direction parallel to or perpendicular to the Z-axis, which is the optical axis, is possible.

On the other hand, in the camera driving device according to an embodiment, there is a technical effect of being able to rotate in a plurality of directions.

For example, the lens unit 1200 is rotationally moved along the first round surface 1310R and the second round surface 1324R with respect to the optical axis, and the lens unit 1200 may be moved by tilting vertically and horizontally with respect to the optical axis along the first round surface 1310R and the second round surface 1324R.

That is, as shown in FIG. 18, the second round surface 1324R of the base 1320 may be formed wider than the first round surface 1310R of the rotor 1310.

In addition, the second round surface 1324R of the base 1320 and the first round surface 1310R of the rotor 1310 are disposed in an oblique direction so that the round surface direction is crossed with the Z axis, so there is a special technical effect that the rotor 1310 can be rotated in a plurality of directions.

Figure 19A:
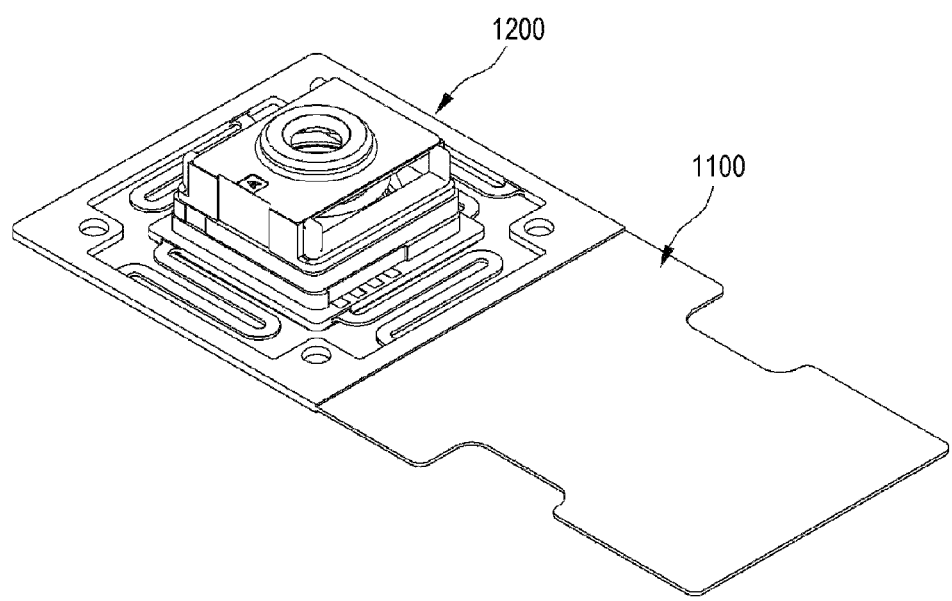
FIG. 19*a* is a perspective view of a lens unit and a sensor unit in a camera module according to a second embodiment of the present invention illustrated in FIG. 14*b*.
Figure 19B:
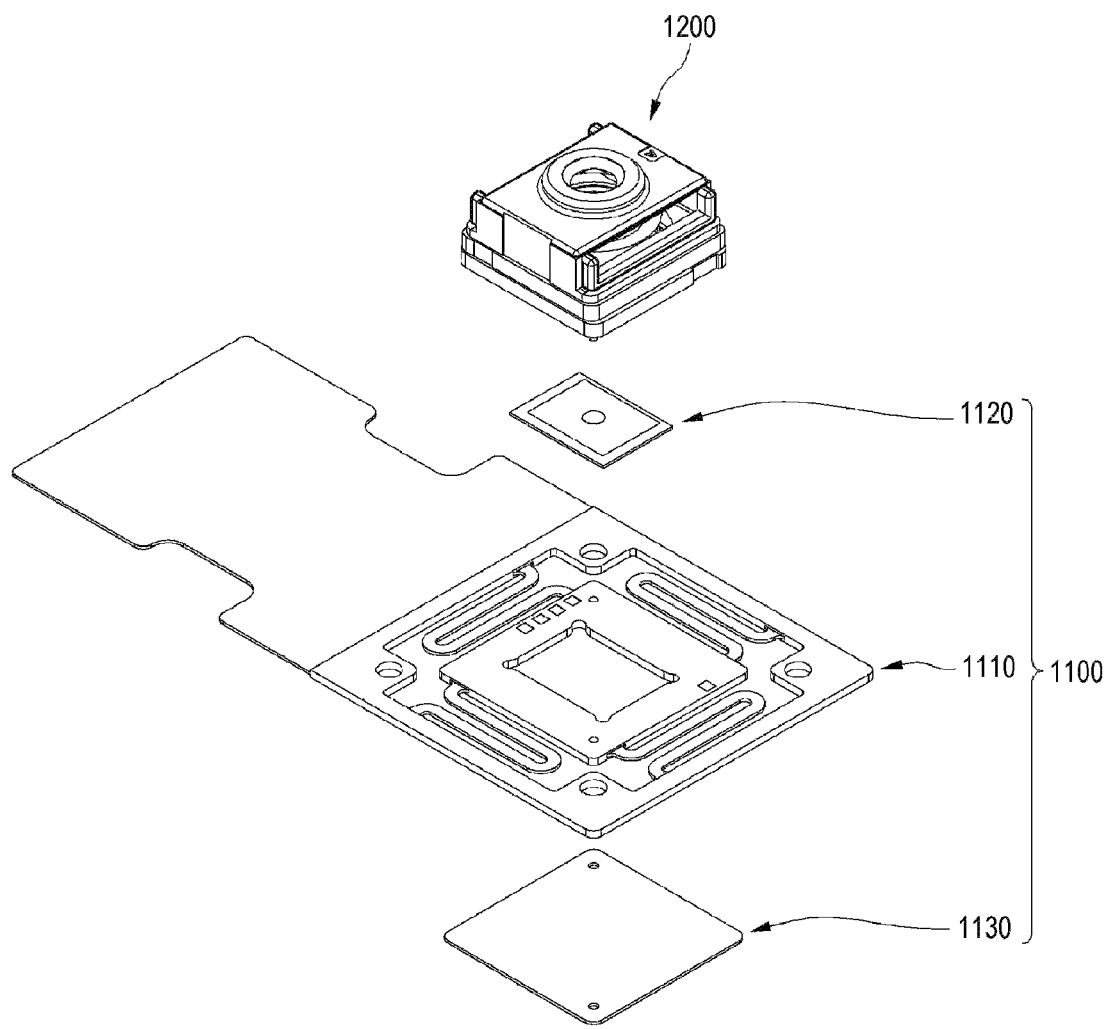
FIG. 19*b* is an exploded perspective view of FIG. 18*a*.

Next, FIG. 19a is a perspective view of a lens unit 1200 and a sensor unit 1100 in a camera module according to a second embodiment of the present invention illustrated in FIG. 14b, and FIG. 19b is an exploded perspective view of FIG. 18a.

Referring to FIG. 19b, in the embodiment, the sensor unit 1100 may include a substrate unit 1110, an image sensor 1120, and a stiffener 1130.

For example, in an embodiment, the sensor unit 1100 may include a substrate unit 1110, an image sensor 1120 disposed on the substrate unit 1110 to be overlapped with the lens unit 1200, and a stiffener 1130 disposed below the substrate unit 1110.

The image sensor 1120 may include a solid-state imaging device such as a complementary metal oxide semiconductor image sensor (CMOS) or a charge coupled device (CCD) and an analog-to-digital conversion unit that converts and outputs an analog electrical signal output from the solid-state image sensor into a digital value.

The stiffener 1130 is disposed at a lower side of the substrate unit 1110 may perform the function of a stiffener to increase strength and rigidity of the substrate unit 1110.

Figure 20:
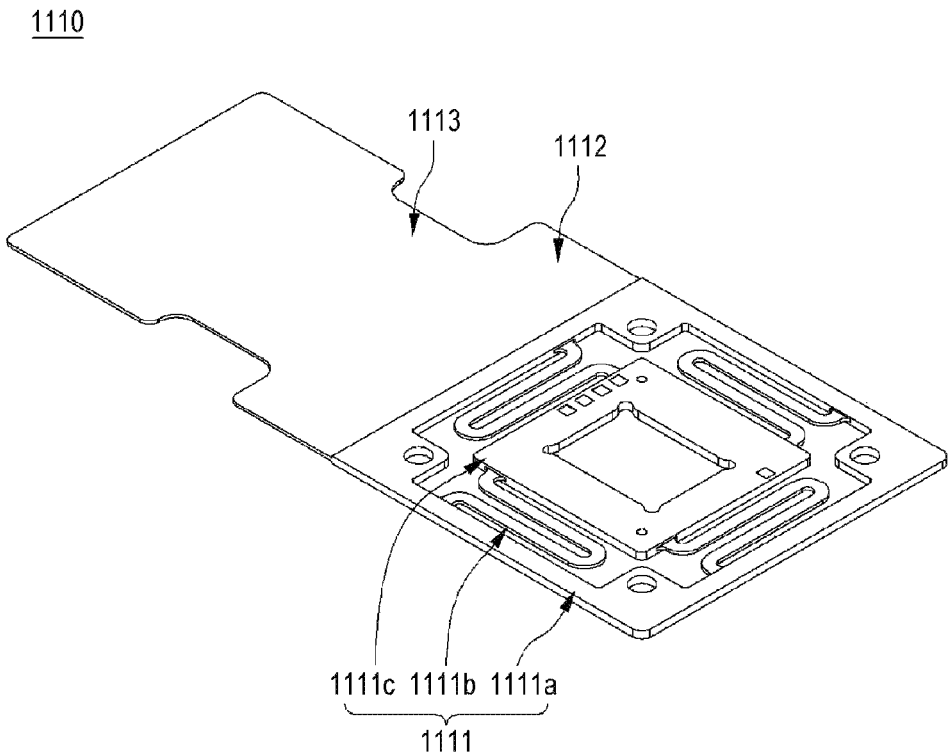
FIG. 20 is an enlarged view of a substrate unit illustrated in FIG. 19*b*.

Next, FIG. 20 is an enlarged view of a substrate unit 1110 illustrated in FIG. 19*b*.

In an embodiment, the substrate 1110 may include a rigid PCB, a flexible PCB, and all boards with wiring patterns that can be electrically connected, such as rigid flexible PCB.

For example, in an embodiment, the substrate unit 1110 may include a first circuit board 1111, a second circuit board 1112, and a third circuit board 1113.

For example, the substrate 1110 may include a first circuit board 1111 on which the actuator 1300 is disposed, a second circuit board 1112 being extended in one direction from the first circuit board 1111 and on which a control semiconductor chip (not shown) is disposed, and a third circuit board 1113 being extended from the second circuit board 1112 toward one side and electrically connected to a predetermined main circuit board (not shown).

The first circuit board 1111 may include a first-first circuit board 1111*a*, a first-second circuit board 1111*b*, and a first-third circuit board 1111*c*.

For example, the first circuit board 1111 may include a first-first circuit board 1111*a* disposed on the outer portion and being extended from the second circuit board 1112, a first-second circuit board 1111*b* being extended from the first-first circuit board 1111*a* toward an inner side and having elasticity, and a first-third circuit board 1111*c* connected to the inner side of the first-second circuit board 1111*b* and disposed with an image sensor 1120.

For example, referring to FIG. 20, the first-first circuit board 1111*a* may be a rigid printed circuit board, and the first-second circuit board 1111*b* may be a flexible PCB or a rigid flexible PCB, and the first-third circuit board 1111*c* may be a rigid circuit board, but is not limited thereto.

At this time, the first-second circuit board 1111*b* may be disposed in a curved shape in the form of a flexible circuit board.

The first-first circuit board 1111*a* may be fixed to the base 1320, and the first-third circuit board 1111*c* may be electrically connected to the image sensor 1120, but is not limited thereto.

In addition, an embodiment may include a gyro sensor (not shown) disposed on the substrate unit 1110 to detect movement, and a driving circuit element (not shown) for driving the actuator 1300 according to the input/output signal of the gyro sensor.

In an embodiment, the gyro sensor may employ a two-axis gyro sensor that detects two amounts of rotational movement, a pitch and a yaw, indicating a large movement in a two-dimensional image frame, and for more accurate image stabilization, a 3-axis gyro sensor that detects both pitch, yaw, and roll movements can be employed. The motion corresponding to the pitch, yaw, and roll detected by the gyro sensor may be converted into an appropriate physical quantity according to a handshake correction method and a correction direction.

Next, FIG. 21 is a cross-sectional view taken along line A1-A1' of a camera module according to an embodiment illustrated in FIG. 14*a*.

Referring to FIGS. 21, 16, and 17 together, the camera module according to the embodiment may include: a rotor 1310 including a first round surface 1310R at an outer side corner and moving with a first accommodating portion; a base 1320 including a second round surface 1324R corresponding to the first round surface 1310R at an inner side corner, and the rotor 1310 being spaced apart from each other in a second accommodating portion; a ball 1316 disposed between the first round surface 1310R of the rotor 1310 and the second round surface 1324R of the base 1320; a first driving unit 1311M disposed in the rotor 1310; and a second driving unit 1322C disposed in the base 1320.

According to the embodiment, the posture can be controlled by using the roll of the ball 1316, and it can also serve to prevent the vibration applied from the upper spring 1350.

In addition, according to an embodiment, the driving force may be improved by disposing the first driving unit 1311M, which is a magnet driving unit, and the second driving unit 1322C, which is a coil driving unit, to face each other.

In an embodiment, the lens unit 1200 may include a predetermined barrel 1220 and a lens 1210. The lens 1210 may include a single or a plurality of lenses. For example, the lens 1210 may include a first lens 1211, a second lens 1212, and a third lens 1213. The lens 1210 may include a liquid lens. For example, the first lens 1211 and the third lens 1213 may be solid lenses, and the second lens 1212 may be a liquid lens, but is not limited thereto. For example, in the second lens 1212, a lens liquid may be disposed between predetermined frames, and the curvature of the lens liquid may be controlled by a predetermined electrode, but is not limited thereto.

In an embodiment, a lens actuator (not shown) capable of driving the lens unit 1200 may be disposed. The lens actuator may be a voice coil motor, a micro actuator, a silicon actuator, a shape memory alloy (SAM), and the like, and it can be applied in various ways such as electrostatic method, thermal method, bimorph method, electrostatic force method, piezo type actuator, and the like, but is not limited thereto.

For example, according to an embodiment, the lens actuator supports the lens unit 1200 to move the lens up and down in response to a control signal from a predetermined control unit, thereby performing an auto-focusing function.

The lens unit 1200 may include a voice coil motor that moves the lens up and down, a MEMS actuator, and a piezo actuator, and another embodiment may include a liquid lens in addition to the lens without a separate actuator.

The voice coil motor moves the entire lens of the lens module up and down, MEMS and piezo actuators move some lenses of the lens module up and down, and the liquid lens may function to adjust the focus by changing the curvature of the interface between two liquids.

According to an embodiment, the OIS may be implemented by module tilt caused by the rotor 1310, the first driving unit 1311M, and the second driving unit 1322C, and the AF may be implemented using a variable lens.

For example, the variable lens may be a variable focus lens. In addition, the variable lens may be a lens whose focus is adjusted. The variable lens may be at least one of a liquid lens, a polymer lens, a liquid crystal lens, a VCM type, and an SMA type.

The liquid lens may include a liquid lens containing one liquid and a liquid lens containing two liquids. A liquid lens containing one liquid can vary the focus by adjusting a membrane disposed at a position corresponding to the liquid, and for example, the focus can be varied by pressing the membrane by the electromagnetic force of a magnet and coil.

A liquid lens including two liquids may control an interface between the conductive liquid and the non-conductive liquid by using a voltage applied to the liquid lens including the conductive liquid and the non-conductive liquid.

The polymer lens may vary the focus of a polymer material through a driving unit such as a piezo. The liquid crystal lens may vary the focus by controlling the liquid crystal by electromagnetic force. The VCM type may vary the focus by adjusting a solid lens or a lens assembly including a solid lens through electromagnetic force between a magnet and a coil. In the SMA type, a focus can be varied by controlling a solid lens or a lens assembly including a solid lens by using a shape memory alloy.

Continuing to refer to FIG. 21, in the embodiment, the direction of the first round surface 1310R of the rotor 1310 or the direction of the second round surface 1324R of the base 1320 may be a direction crossing the direction of the optical axis Z.

For example, in an embodiment, the direction of the first round surface 1310R of the rotor 1310 may be a cross direction that is not parallel to the direction of the optical axis Z. For example, the direction of the first round surface 1310R of the rotor 1310 may be oblique to the optical axis Z.

In addition, the direction of the second round surface 1324R of the base 1320 may be a crossed direction that is not parallel to the direction of the optical axis Z. For example, the direction of the second round surface 1324R of the base 1320 may be oblique to the optical axis Z.

The lens unit 1200 is rotationally moving along the first round surface 1310R and the second round surface 1324R with respect to the optical axis, and the lens unit 1200 may move by tilting vertically and horizontally along the first round surface 1310R and the second round surface 1324R with respect to the optical axis.

The embodiment is a method of moving the entire module including the lens and the image sensor, and the correction range is wider than that of the lens movement method, and since the optical axis of the lens and the axis of the image sensor are not shifted, there is a unique technical effect of minimizing image distortion and eliminating image distortion.

Accordingly, according to the driving device of the camera module according to an embodiment and the camera module including the same, there is a technical effect that can provide an excellent OIS function without image distortion even during video photographing.

While our previous technology enables rotational driving in one direction, such as a direction parallel to or perpendicular to the Z-axis, which is an optical axis, in the camera driving device according to the embodiment, there is a technical effect of being able to rotate in a plurality of directions.

For example, the lens unit 1200 is rotationally moved along the first round surface 1310R and the second round surface 1324R with respect to an optical axis, and the lens unit 1200 may be moved by tilting vertically and horizontally with respect to the optical axis along the first round surface 1310R and the second round surface 1324R.

In addition, the second round surface 1324R of the base 1320 and the first round surface 1310R of the rotor 1310 are disposed in an oblique direction so that the round surface direction is crossed with the Z axis, so that there is a special technical effect that the rotor 1310 can be rotated in a plurality of directions.

Referring to FIGS. 21 and 18, in an embodiment, the lens unit 1200 is rotationally moved along the first round surface 1310R and the second round surface 1324R with respect to the optical axis, and the lens unit 1200 may be moved by tilting up, down, left, and right with respect to the optical axis Z along the first round surface 1310R and the second round surface 1324R.

Figure 22:
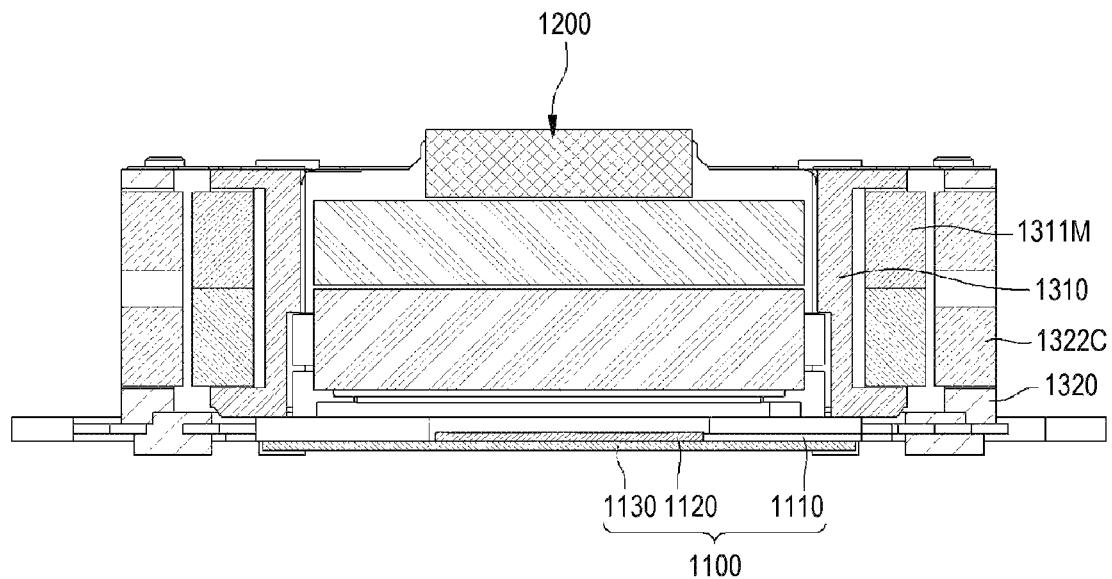
FIG. 22 is a cross-sectional perspective view taken along line A2-A2' of a camera module according to an embodiment illustrated in FIG. 14*a*.

Next, FIG. 22 is a cross-sectional perspective view taken along line A2-A2' of the camera module according to an embodiment illustrated in FIG. 14a, in which the tilting angle is 0°.

Figure 23A:
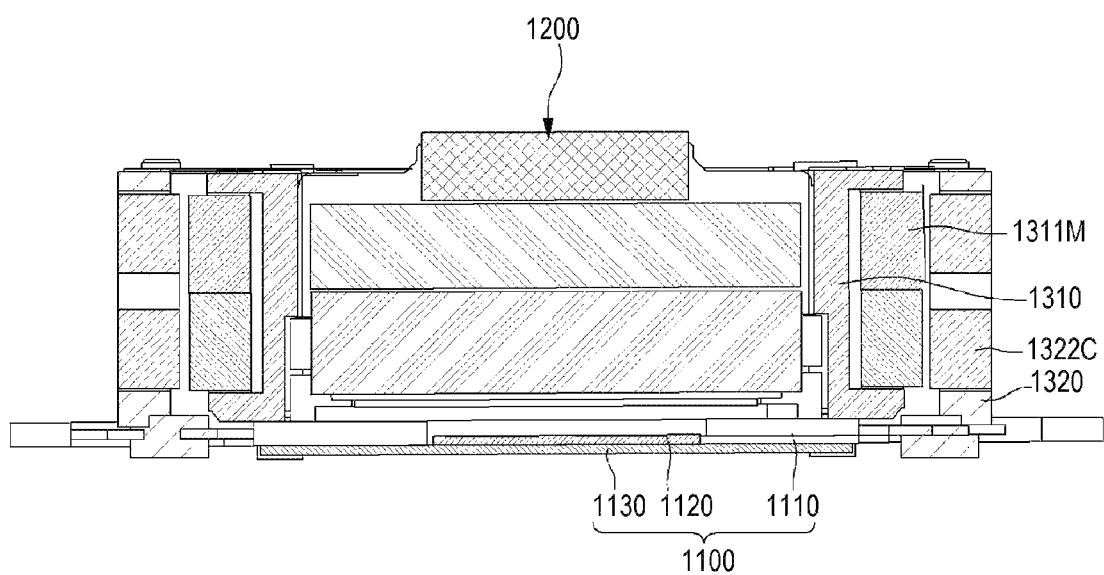
FIG. 23*a* is a first operation example of a camera module according to an embodiment illustrated in FIG. 22.
Figure 23B:
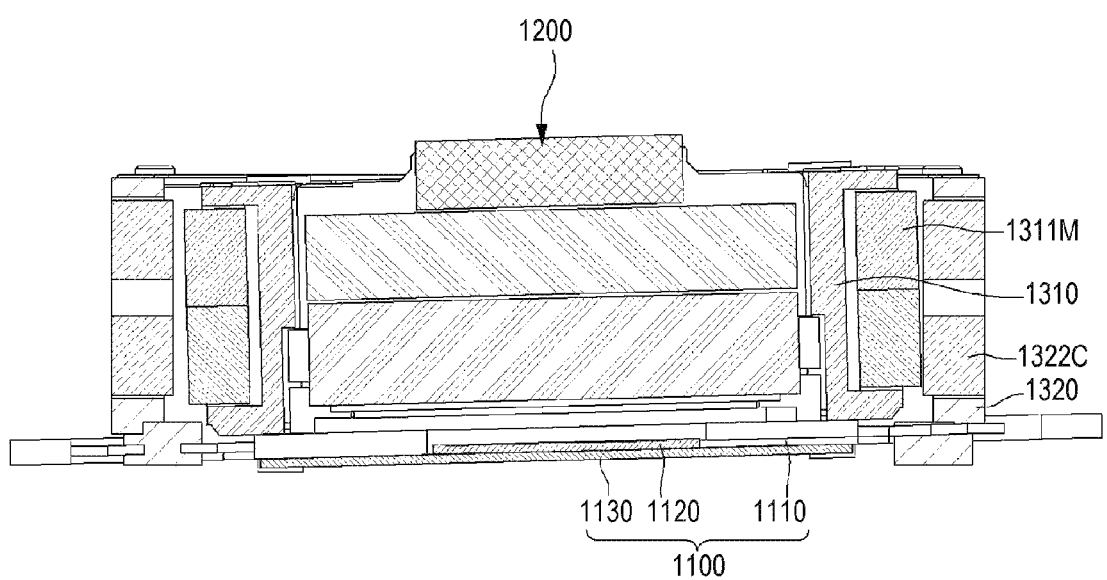
FIG. 23*b* is a second exemplary operation view of a camera module according to an embodiment illustrated in FIG. 22.

Through this, as illustrated in FIGS. 23a and 23b, it is a method in which the entire module including the lens and the image sensor is moved, having wider correction range than that of the lens movement method, and since the optical axis of the lens and the axis of the image sensor are not tilted, there is a unique technical effect of minimizing image distortion and eliminating image distortion.

According to an embodiment, it is possible to secure a rotation angle of about ±0.8° to ±2.0° by a method in which an entire module including the lens and the image sensor is driven, and through this, an effective OIS function can be performed.

For example, FIG. 23a is an exemplary view illustrating a first operation of the camera module according to an embodiment illustrated in FIG. 22, in which the tilting angle is ±1°.

In addition, FIG. 23b is a second exemplary view illustrating a second operation of the camera module according to an embodiment illustrated in FIG. 22, in which the tilting angle is ±2°.

Normally, the required rotation angle when photographing a video while walking is ±1°, according to an embodiment, but it is possible to implement up to ±2° by moving the entire module including the lens and the image sensor, so that the correction range is wider than that of the lens shift method, and since the optical axis of the lens and the axis of the image sensor do not tilted even when photographing a video while running, there is a unique technical effect having no image distortion by minimizing image deformation.

In addition, the embodiment has a technical effect of providing an excellent OIS function having no image distortion and at the same time a technical effect of providing a miniature camera module.

The technical effects of the embodiments are not limited to the contents described in the present description, and include those identified from the illustration of the invention.

Modified embodiments according to the present embodiments may include some components of the first embodiment and some components of the second embodiment together. That is, modified embodiments may include the first embodiment, but some configurations of the first embodiment may be omitted, and may include some configurations of the corresponding second embodiment. Alternatively, the modified embodiments may include the second embodiment, but some components of the second embodiment are omitted and include some components of the corresponding first embodiment.

Features, structures, effects, and the like described in the above embodiments are included in at least one embodiment of the present invention, and are not necessarily limited to only one embodiment. In addition, the features, structures, effects, and the like illustrated in the embodiments may be combined or modified with respect to other embodiments by those skilled in the art to which the embodiments belong. Therefore, contents related to such combinations and modifications should be construed as being included in the scope of the present invention.

In addition, the above description has been made with respect to the embodiments, which are merely examples and are not intended to limit the embodiments, and those of ordinary skill in the art to which the embodiment belongs will appreciate that various modifications and applications not illustrated above are possible without departing from the essential characteristics of the present embodiment. For example, each component specifically illustrated in the embodiments may be modified. And differences relating to such modifications and applications will have to be construed as being included in the scope of the invention defined in the appended claims.

The invention claimed is:

1. A camera module comprising:
a stator;
a mover disposed inside the stator;
a first driving unit disposed on the stator;
a second driving unit disposed on the mover and facing the first driving unit;
a stiffener comprising an outer side portion coupled to the stator, an inner side portion coupled to the mover, and a connecting portion connecting the outer side portion and the inner side portion;
a substrate coupled to the stator and the mover, and disposed on the stiffener; and
a lens module coupled to the substrate,
wherein the substrate comprises an outer side elastic portion coupled to the stator, an inner side elastic portion coupled to the mover, and a connecting elastic portion connecting the outer side elastic portion and the inner side elastic portion,
wherein the inner side elastic portion comprises first to fourth corner regions,
wherein the outer side elastic portion comprises fifth to eighth corner regions adjacent to the first to fourth corner regions, respectively, and
wherein the connecting elastic portion comprises a first connecting elastic portion connecting the first corner region and the sixth corner region, a second connecting elastic portion connecting the second corner region and the seventh corner region, a third connecting elastic portion connecting the third corner region and the eighth corner region, and a fourth connecting elastic portion connecting the fourth corner region and the fifth corner region.

2. The camera module according to claim 1, wherein the outer side elastic portion and the outer side portion are overlapped in an optical axis direction,
wherein the inner side elastic portion and the inner side portion are overlapped in the optical axis direction, and
wherein the connecting elastic portion and the connecting portion are overlapped in the optical axis direction.

3. The camera module according to claim 1, wherein the mover comprises a groove formed on an upper surface and a first protruding portion protruding higher than the upper surface from the groove, and
wherein the first protruding portion is coupled to the inner side portion and the inner side elastic portion.

4. The camera module according to claim 1, wherein the stator comprises a second protruding portion protruding upward from an upper surface, and
wherein the second protruding portion is coupled to the outer side portion and the outer side elastic portion.

5. The camera module according to claim 4, wherein an upper end of the second protruding portion is disposed higher than an upper end of the first protruding portion.

6. The camera module according to claim 4, wherein the substrate comprises a flexible printed circuit board (FPCB).

7. The camera module according to claim 1, wherein the lens module comprises a protrusion protruding from a lower surface, and
wherein the protrusion is coupled to the inner side portion and the inner side elastic portion.

8. The camera module according to claim 1, wherein the first driving unit is disposed on a bottom surface of an inner side surface of the stator, and
wherein the second driving unit is disposed on a lower surface of the mover.

9. The camera module according to claim 8, wherein the second driving unit comprises first to fourth magnets having the 2×2 arrangement,
wherein, in the first and third magnets, regions adjacent to each other have a first polarity, and regions spaced apart from each other have a second polarity; and
wherein, in the second and fourth magnets, regions adjacent to each other have the first polarity, and regions spaced apart from each other have the second polarity.

10. The camera module according to claim 9, wherein the first driving unit comprises:
first and second coils being overlapped with the regions having the first polarity among the first to fourth magnets in an optical axis direction; and
third and fourth coils being overlapped with the regions having the second polarity among the first to fourth magnets in the optical axis direction.

11. The camera module according to claim 10, wherein lengths in a first direction of the first and second coils is longer than lengths in the first direction of the third and fourth coils, and
wherein lengths of the first and second coils in a second direction perpendicular to the first direction is shorter than lengths of the third and fourth coils in the second direction.

12. The camera module according to claim 10, wherein the first driving unit comprises fifth and sixth coils not being overlapped with the first to fourth magnets in an optical axis direction.

13. A camera module comprising:
a stator;
a mover disposed inside the stator;
a first driving unit disposed on the stator;
a second driving unit disposed on the mover and facing the first driving unit;
a stiffener comprising an outer side portion coupled to the stator, an inner side portion coupled to the mover, and a connecting portion connecting the outer side portion and the inner side portion;
a substrate coupled to the stator and the mover, and disposed on the stiffener;
a lens module coupled to the substrate; and
a guide ball disposed between the stator and the mover.

14. The camera module according to claim 13, wherein the mover comprises a seating groove formed on an outer side surface, and
wherein at least a portion of the guide ball is disposed in the seating groove.

15. The camera module according to claim 13, wherein a region in contact with the guide ball among inner side surfaces of the stator is formed as a curved surface.

16. A camera module comprising:
   a stator;
   a mover disposed in the stator;
   a first driving unit disposed on the stator;
   a second driving unit disposed on the mover and facing the first driving unit;
   a stiffener coupled to the stator and the mover;
   a substrate coupled to the stator and the mover and disposed on the stiffener; and
   a lens module coupled to the substrate,
   wherein a region of the substrate being overlapped with the stiffener has the same shape as the stiffener.

17. The camera module according to claim 16, wherein the substrate comprises an outer side elastic portion coupled to the stator, an inner side elastic portion coupled to the mover, and a connecting elastic portion connecting the outer side elastic portion and the inner side elastic portion.

18. The camera module according to claim 17, wherein the stiffener comprises an outer side portion coupled to the stator, an inner side portion coupled to the mover, and a connecting portion connecting the outer side portion and the inner side portion,
   wherein the outer side elastic portion and the outer side portion are overlapped in an optical axis direction,
   wherein the inner side elastic portion and the inner side portion are overlapped in the optical axis direction, and
   wherein the connecting elastic portion and the connecting portion are overlapped in the optical axis direction.

* * * * *